US012023936B2

(12) United States Patent
Oya

(10) Patent No.: US 12,023,936 B2
(45) Date of Patent: Jul. 2, 2024

(54) LIQUID CARTRIDGE

(71) Applicant: CANON KABUSHIKI KAISHA, Tokyo (JP)

(72) Inventor: Katsunori Oya, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 105 days.

(21) Appl. No.: 17/944,761

(22) Filed: Sep. 14, 2022

(65) Prior Publication Data

US 2023/0090388 A1 Mar. 23, 2023

(30) Foreign Application Priority Data

Sep. 22, 2021 (JP) ................................ 2021-154580

(51) Int. Cl.
*B41J 2/175* (2006.01)

(52) U.S. Cl.
CPC ....... *B41J 2/17596* (2013.01); *B41J 2/17523* (2013.01)

(58) Field of Classification Search
CPC .... B41J 2/175; B41J 2/17503; B41J 2/17506; B41J 2/17509; B41J 2/1752; B41J 2/17523; B41J 2/17553; B41J 2/17596
See application file for complete search history.

(56) References Cited

U.S. PATENT DOCUMENTS

| | | | | |
|---|---|---|---|---|
| 11,597,210 | B2 * | 3/2023 | Kishikawa | B41J 2/17553 |
| 2018/0272741 | A1 * | 9/2018 | Kobayashi | B41J 2/1752 |
| 2022/0088937 | A1 | 3/2022 | Oya | B41J 2/175 |

FOREIGN PATENT DOCUMENTS

| | | |
|---|---|---|
| JP | 2018-161876 | 10/2018 |

* cited by examiner

*Primary Examiner* — Anh T Vo
(74) *Attorney, Agent, or Firm* — Venable LLP

(57) ABSTRACT

A liquid cartridge includes a valve mechanism including a pressed member configured to be movable in a predetermined depressing direction, a valve element for a communicating hole, a biasing member that biases the valve element, and a switching mechanism that restricts a movable range of the pressed member, and that switches a range of restricting the movable range. The valve element closes the communicating hole with a first depressing amount, and maintains the closed state under a second depressing amount. The restricting portion has a first restricting portion that restricts the movable range to a first movable range, and a second restricting portion that restricts the movable range to a second movable range. The switching mechanism switches the movable range from one to another of a first restricting state by the first restricting portion and a second restricting state by the second restricting portion.

8 Claims, 21 Drawing Sheets

1

LIQUID CARTRIDGE

BACKGROUND OF THE INVENTION

Field of the Invention

The present invention relates to a liquid cartridge provided with a reservoir where liquid used for recording images is reserved.

Description of the Related Art

A liquid cartridge used in a recording apparatus includes a container capable of reserving liquid, and an atmosphere communicating hole for communication among a liquid supply hole for supplying liquid to the apparatus, the container, and the atmosphere. Externally blocking the liquid supply hole and the atmosphere communicating hole prevents liquid from leaking to the outside of the container before mounting the liquid cartridge to the apparatus. Opening each of the liquid supply hole and the atmosphere communicating hole when mounting the liquid cartridge to the recording apparatus enables the liquid to be supplied to a liquid discharge head that discharges liquid to a recording medium.

Japanese Patent Application Publication No. 2018-161876 discloses a liquid cartridge having a mechanism in which an atmosphere communicating hole that has small repelling force is opened when mounting a liquid cartridge. The mechanism has a valve element that blocks the atmosphere communicating hole, a lever that is pivotable to hold down the valve element, and a spring that acts in a direction of opening the valve element. In a state prior to mounting to the apparatus, the lever is at a position of pressing the valve element down, and is biased by the spring, in order to block the atmosphere communicating hole. When mounting the liquid cartridge to the apparatus, the lever pivots by being lightly pressed by a protrusion provided to the apparatus, the holding force that was applied to the valve element is removed, and the valve element opens to the atmosphere under the biasing force of the spring, thus, reducing the repelling force when mounting.

Meanwhile, there has been a problem in that, once a liquid cartridge is mounted to the apparatus, and thereafter is detached from the apparatus in a state in which a great amount of liquid is reserved inside the container and left standing, liquid readily leaks from the atmosphere communicating hole or the liquid supply hole.

The lever that pivots when mounting the liquid cartridge to the apparatus in the mechanism for opening the atmosphere communicating hole described in Japanese Patent Application Publication No. 2018-161876 does not return to the original position even when the liquid cartridge is detached from the apparatus, and accordingly the atmosphere communicating hole remains opened.

As a result, in a case in which there is trouble in the opening and closing of the liquid supply hole, for example, there is a possibility that liquid will leak if the liquid supply hole remains open when detached the liquid cartridge from the apparatus.

SUMMARY OF THE INVENTION

The technology of the present disclosure provides a liquid cartridge of which open/closed state of the atmosphere communicating hole can be switched in accordance with mounting/detaching of the liquid cartridge.

According to an aspect of the present disclosure, it is provided a liquid cartridge including a container including a reservoir in which a liquid used for recording images is reserved, a supply hole for causing the liquid reserved in the reservoir to flow to outside of the reservoir, and a communicating hole for causing inside of the reservoir to communicate with an atmosphere, and a valve mechanism that opens and closes the communicating hole, wherein the liquid cartridge is configured to be capable of supplying the liquid reserved in the reservoir to the outside through the supply hole by the valve mechanism opening the communicating hole and cause the inside of the reservoir to communicate with the atmosphere, the valve mechanism includes a pressed member configured to be movable in a predetermined depressing direction by being pressed, a valve element that is disposed further in the depressing direction than the pressed member, and that is configured to be capable of moving to come into contact with or to be distanced from the communicating hole in accordance with a depressing amount of the pressed member, and open and close the communicating hole, a biasing member that biases the valve element in a direction opposite to the depressing direction, and a switching mechanism that is a restricting portion restricting a movable range of the pressed member in the depressing direction, and also that is capable of switching a range of restricting the movable range, the valve element is configured to change from an open state of opening the communicating hole to a closed state of closing the communicating hole when the depressing amount reaches a first depressing amount, and to maintain the closed state under a second depressing amount that is greater than the first depressing amount, the restricting portion has a first restricting portion that restricts the movable range to a first movable range in which the valve element maintains the closed state regardless of a magnitude of the depressing amount, and a second restricting portion that restricts the movable range to a second movable range in which the valve element can assume either of the open state and the closed state, and when the depressing amount reaches the second depressing amount, the switching mechanism switches restriction of the movable range by the restricting member from one to another of a first restricting state by the first restricting portion and a second restricting state by the second restricting portion, and from the other to the one.

Further features of the present invention will become apparent from the following description of exemplary embodiments with reference to the attached drawings.

DESCRIPTION OF THE EMBODIMENTS

Preferred embodiments of the technology of the present disclosure will be described below with reference to the Figures. It should be noted that dimensions, materials, and shapes of components, relative placements thereof, and so forth, described below, are to be changed as appropriate in accordance with recording apparatuses to which the technology of the present disclosure is to be applied, configurations of liquid cartridges, and various types of conditions. Accordingly, limiting the scope of this invention to the description below is not intended. Well-known technology or publicly known technology pertaining to this technical field is applicable to configurations or processes that are not illustrated or described in particular. Also, repetitive description may be omitted.

First Embodiment

Figure 1:
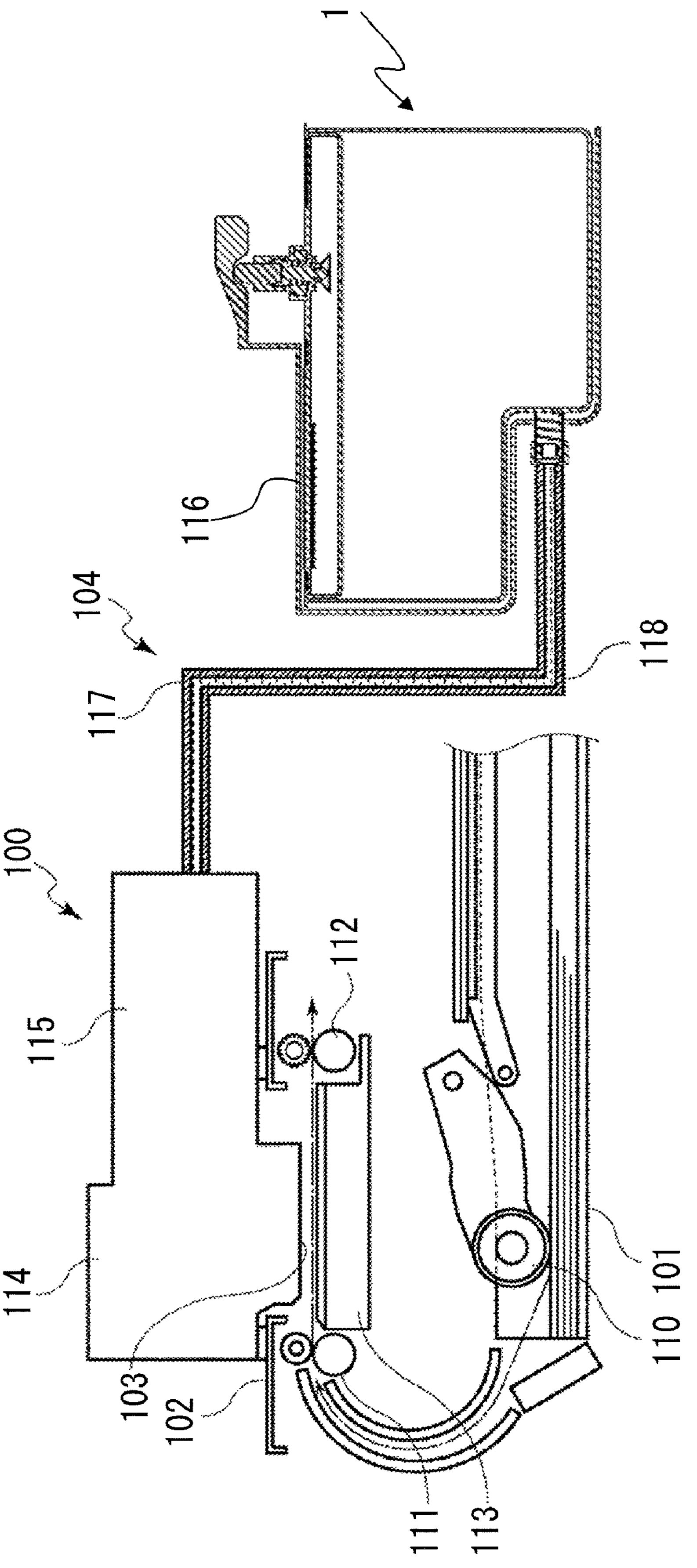
FIG. 1 is a schematic diagram of a recording apparatus according to a first embodiment.

FIG. 1 is a cross-sectional view schematically illustrating principal portions inside of a recording apparatus 100 according to a first embodiment. Note that in FIG. 1, sizes of some members are changed, and some members are omitted from illustration, for the sake of convenience in description.

The recording apparatus 100 is provided with a feed unit 101, a transport unit 102, a discharge unit 103, and a supply unit 104. The feed unit 101 uses a feed roller 110 to separate individual sheets of print media from a bundle of print media in the state of sheets, and feed the print media to the transport unit 102. The transport unit 102 is provided on a downstream side of the feed unit 101 in a transport direction, and is provided with a platen 113 that holds the print media. The platen 113 is provided between a transport roller 111 and a sheet discharge roller 112. The transport unit 102 uses the transport roller 111, the sheet discharge roller 112, and so forth, to transport the print media fed from the feed roller 110.

The discharge unit 103 discharges liquid onto the print media by a liquid discharge head 115 mounted on a carriage 114. The print media transported by the transport unit 102 is supported from below in a vertical direction by the platen 113. The liquid discharge head 115 situated above in the vertical direction discharges liquid, thereby forming images based on image information. A cartridge case 116 is an accommodation unit capable of accommodating a liquid cartridge 1. Details of mounting the liquid cartridge 1 to the cartridge case 116 will be described later. The supply unit 104 is configured to be capable of supplying liquid from the liquid cartridge 1 to the liquid discharge head 115 via a channel 118 and a supply tube 117 that is flexible.

The liquid is ink in the present embodiment, and more specifically, four supply tubes 117 for ink of each color (black, magenta, cyan, and yellow) to flow, extend from the cartridge case 116, and are connected to the liquid discharge head 115 in a bundled state.

Upon liquid supplied to the liquid discharge head 115 being discharged from discharge orifices of the liquid discharge head 115, liquid of the same amount of liquid discharged from the liquid discharge head 115 is supplied thereto from the liquid cartridge 1, via the supply unit 104. Also, in the liquid cartridge 1, air of the same amount as the amount of liquid supplied to the liquid discharge head 115 flows into a container in which the ink is reserved in the liquid cartridge 1.

Figure 2:
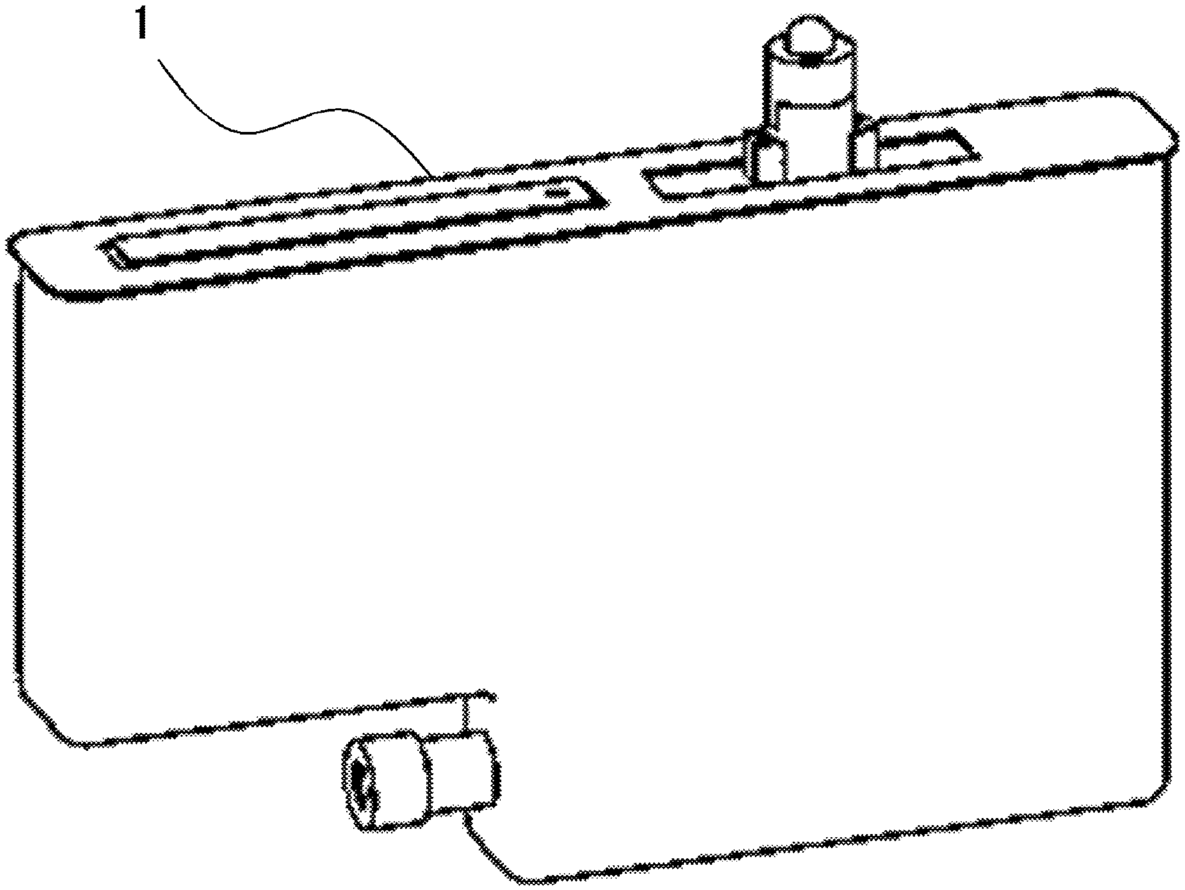
FIG. 2 is an external view of a liquid cartridge according to the first embodiment.

Next, the liquid cartridge 1 according to the first embodiment will be described. FIG. 2 is an external view of the liquid cartridge 1 according to the present embodiment. Also, FIG. 3 is a disassembled view of the liquid cartridge 1.

Figure 3:
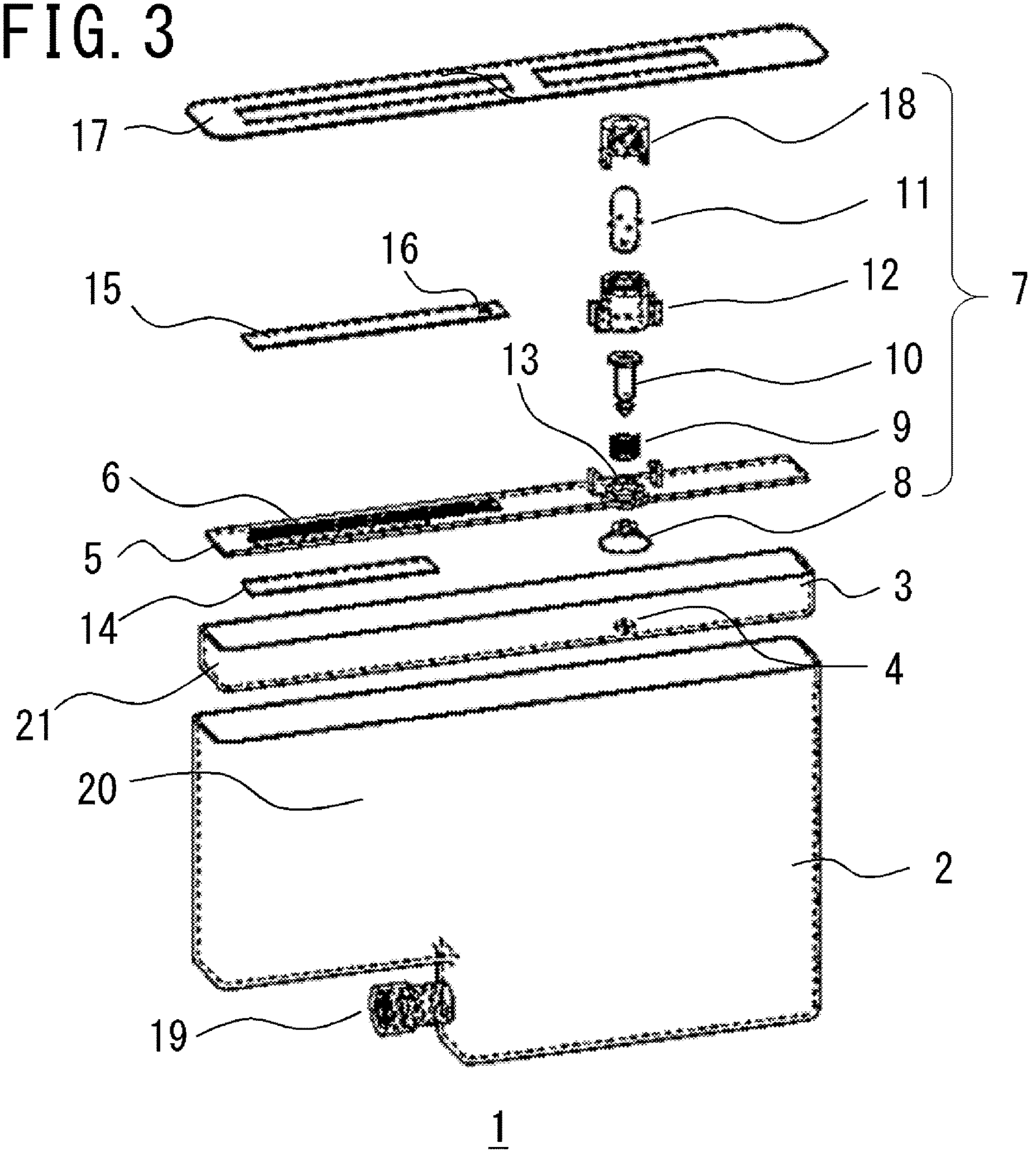
FIG. 3 is a disassembled view of the liquid cartridge according to the first embodiment.

As illustrated in FIG. 3, the liquid cartridge 1 reserves ink, which is the liquid used for recording images, in a space 20 that forms a reservoir of a container 2. The ink is supplied to the recording apparatus 100 from an ink supply hole 19 that serves as a liquid supply hole for the liquid reserves in the reservoir to flow to the outside of the reservoir. The container 2 has an inner lid 3 and an upper lid 5 that are fused by a sealing film 17. The space 20 forming the reservoir that is filled with ink is formed by the container 2 and the inner lid 3, and a space 21 serving as an atmospheric chamber that supplies atmosphere, are each formed by the inner lid 3 and the upper lid 5.

The inner lid 3 is a partition between the reservoir and the atmospheric chamber. An atmosphere communicating hole 4 for supplying atmosphere from the space 21 for supplying atmosphere to the space 20 of the container 2 that is filled with ink, so that the inside of the reservoir communicates with the atmosphere, is formed in the inner lid 3. Also, a bent channel 6 is formed in the upper lid 5, and a through hole, omitted from illustration, for communication between the space 21 that supplies the atmosphere and the atmospheric space, is formed in the bent channel 6. A semipermeable membrane 14 that does not allow passage of liquid but allows passage of gas is adhered to the through hole of the bent channel 6, on the side of the space 21 where the atmosphere is supplied. Also, a film 15 provided with an opening, in which an opening 16 is formed, is fused on the atmosphere side of the through hole of the bent channel 6. Accordingly, when supplying the atmosphere to the space 20 filled with ink, the atmosphere passes from the atmospheric space, through the opening 16, the bent channel 6, the through hole that is omitted from illustration, the semipermeable membrane 14, the space 21 to which the atmosphere is supplied, and the atmosphere communicating hole 4, in that order, and reaches the space 20 filled with ink.

Figure 4:
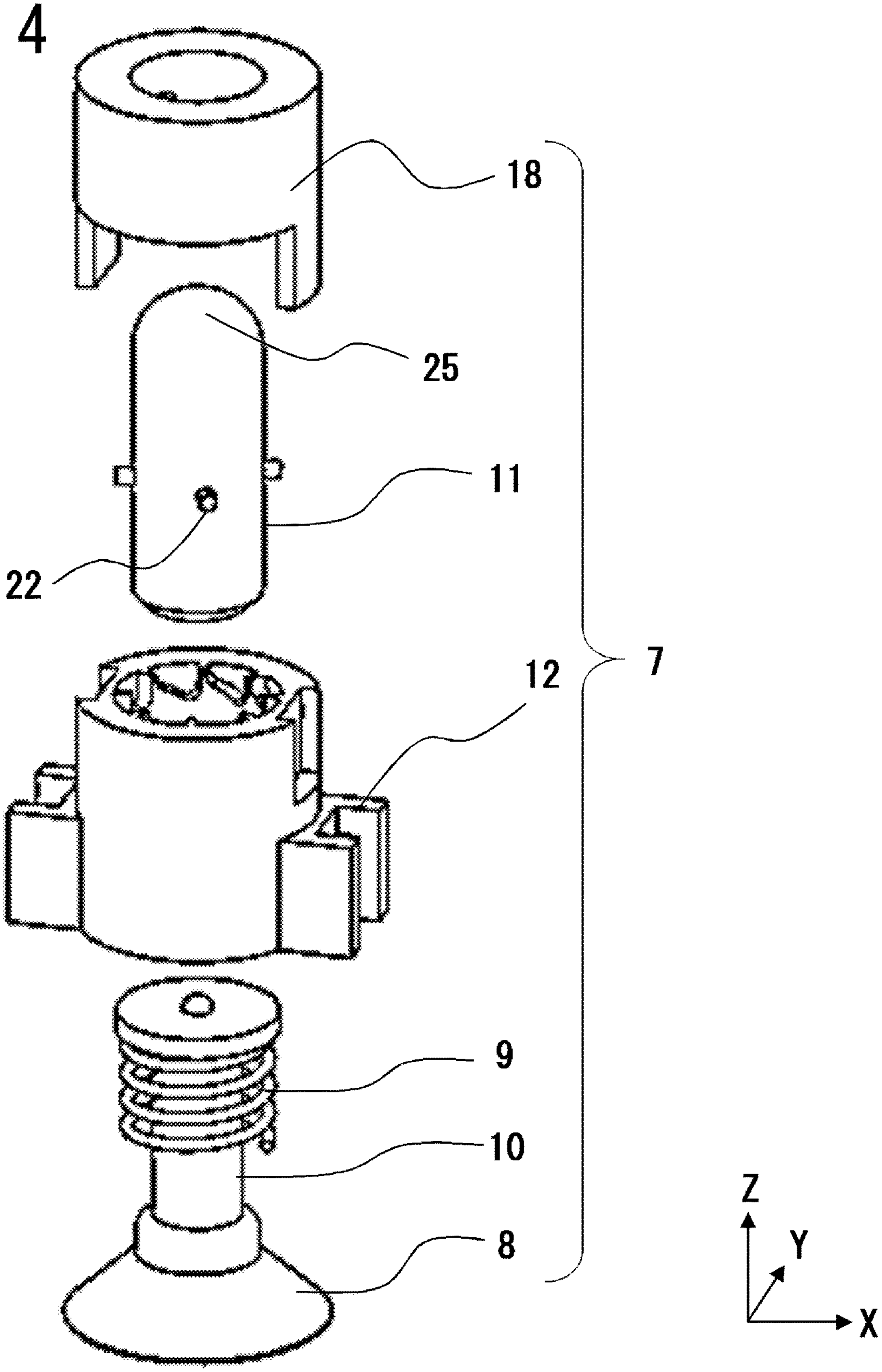
FIG. 4 is a detailed explanatory diagram of a valve mechanism according to the first embodiment.

FIG. 4 is a detailed explanatory diagram of a configuration of a valve mechanism 7 that opens and closes the atmosphere communicating hole 4. The valve mechanism 7 is made of a pad 8 formed of rubber, a spring 9, a rod 10, and a revolver 11. A tip end of the rod 10 serving as a rod shaft portion passes through the spring 9 and a rod shaft hole 13 of the upper lid 5, and is fit into the pad 8. Further, a first attaching member 12 is fixed to the upper lid 5. Also, the revolver 11 is provided as a pressed member, and is sandwiched between the first attaching member 12 and a second attaching member 18. First guide portions 22 that serve as protruding portions are provided to the revolver 11. The first guide portions 22 are provided on the revolver 11 protruding in a direction orthogonal to a depressing direction of the pad 8 and the rod 10 that make up a valve element.

Also, in FIG. 4, a Z axis that is parallel to the direction in which the rod 10, the first attaching member 12, the revolver 11, and the second attaching member 18 extend, and an X axis and a Y axis that are orthogonal to each other and form an XY plane that is orthogonal to the Z axis, are set. In the present embodiment, the first guide portions 22 are equidistantly disposed on the circumference of the cylinder of the revolver 11, at equal quarters in XY plan view, as an example. The revolver 11 is a pressed member that is configured to be capable of traveling in a predetermined depressing direction, a direction parallel to the Z axis here, by being pressed. The pad 8 and the rod 10 are disposed further in the depressing direction than the revolver 11, i.e., on the downstream side of the revolver 11 (negative side of Z axis) in the depressing direction. The pad 8 and the rod 10 are configured to be capable of moving so as to come into contact with or to be distanced from the atmosphere communicating hole 4 in accordance with the amount of depressing of the revolver 11, and function as a valve element that opens/closes the atmosphere communicating hole 4. The pad 8 and the rod 10 are biased in the opposite direction from the depressing direction, i.e., in the positive direction of the Z axis, by the spring 9 that is a biasing member.

According to the above configuration, the liquid cartridge 1 according to the present embodiment is a liquid cartridge configured to enable supply of liquid reserved in the reservoir to the outside from the supply hole, by the valve mechanism opening the communicating hole and causing the inside of the reservoir to communicate with the atmosphere.

Figure 5A:
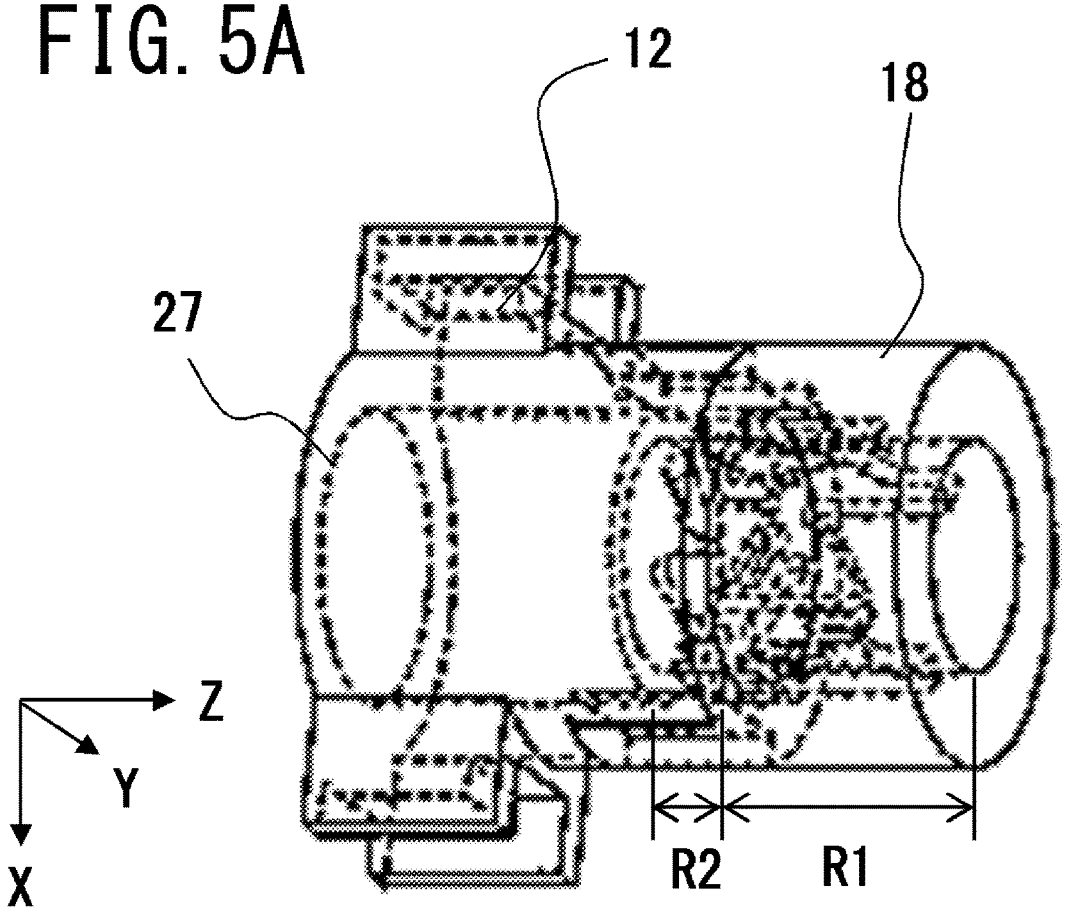
FIGS. 5A and 5B are internal structure diagrams of an attaching member according to the first embodiment.
Figure 5B:
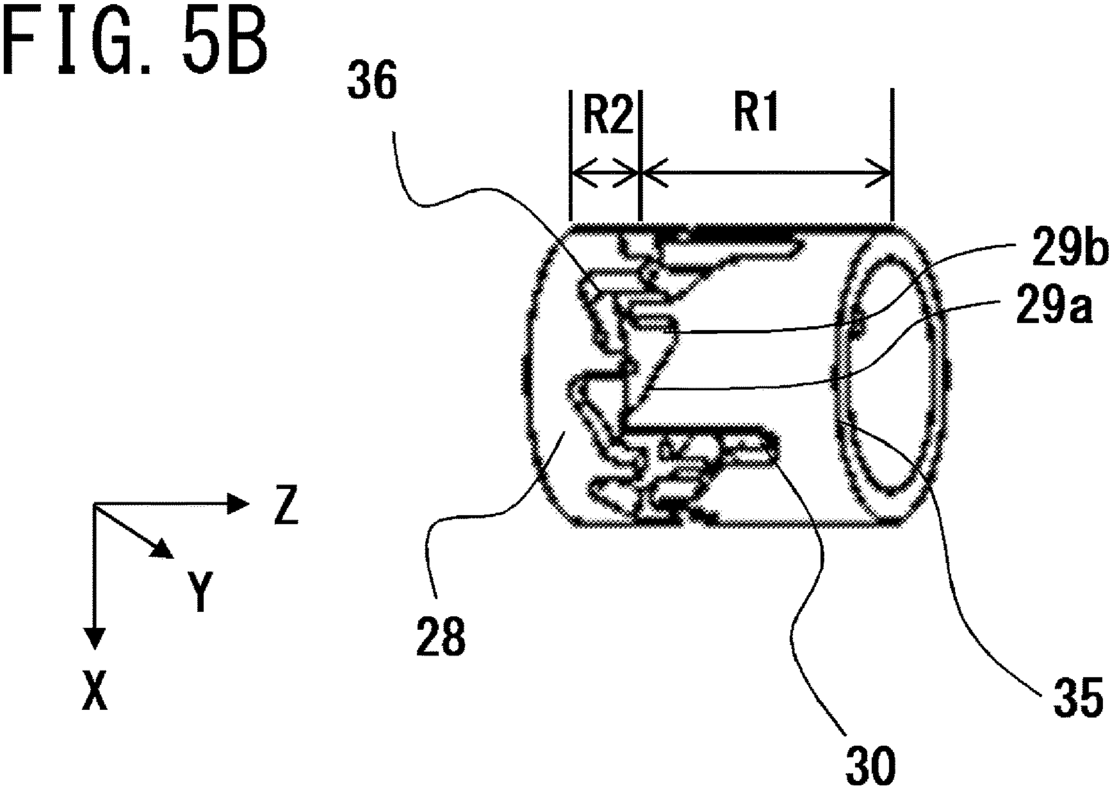

Next, FIG. 5A is a diagram illustrating the first attaching member 12 and the second attaching member 18, and FIG. 5B is a diagram illustrating part of internal structures of the first attaching member 12 and the second attaching member 18. Regions indicated by R1 and R2 in FIG. 5A correspond to regions indicated by R1 and R2 in FIG. 5B. Note that in FIG. 5B, part of an internal structure 28 of the first attaching member 12 and part of an internal structure 35 of the second attaching member 18 are each omitted. Specifically, an outer-side portion of the first attaching member 12 is omitted from the internal structure 28 of the first attaching member 12 indicated by region R2 in FIG. 5B, with a cylinder inner diameter 27 of the first attaching member 12 as the boundary thereof. Also, an outer-side portion of the second attaching member 18 is omitted from the internal structure 35 of the second attaching member 18 indicated by region R1 in FIG. 5B, with the cylinder inner diameter 27 of the first attaching member 12 as the boundary thereof.

In the present embodiment, third grooves 36 are provided in the internal structure 28 of the first attaching member 12 in the circumferential direction thereof centered on the Z axis in XY plan view, assuming that the Z axis passes through the center of the cylinder inner diameter 27, equidistantly at equal eighths as an example. Also, first grooves 29 and second grooves 30 are alternately provided in the internal structure 35 of the second attaching member 18 in the circumferential direction thereof centered on the Z axis in XY plan view, assuming that the Z axis passes through the center of the cylinder inner diameter 27, equidistantly at equal quarters.

The third grooves 36 are provided to be situated between the first grooves 29 and the second grooves 30 in a state in which the first attaching member 12 and the second attaching member 18 are fit to each other. Also, the first grooves 29, the second grooves 30, and the third grooves 36 function as restricting portions that restrict a movable range of the revolver 11 in the depressing direction, by retaining first guide portions 22 of the revolver 11. The revolver 11 and the rod 10 are capable of movement in the Z axis direction in a region on the inner side of the cylinder inner diameter 27 of the first attaching member 12 and the second attaching member 18.

Figure 6A:
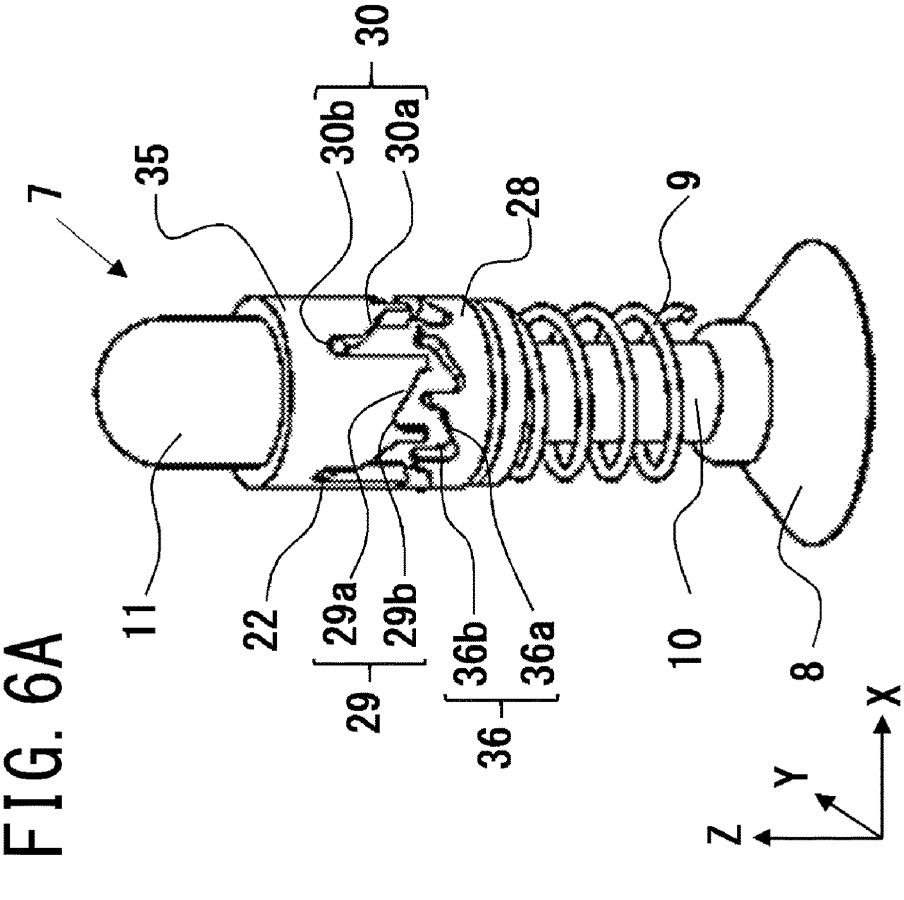
FIGS. 6A and 6B are state diagrams illustrating open/closed states of the valve mechanism according to the first embodiment.
Figure 6B:
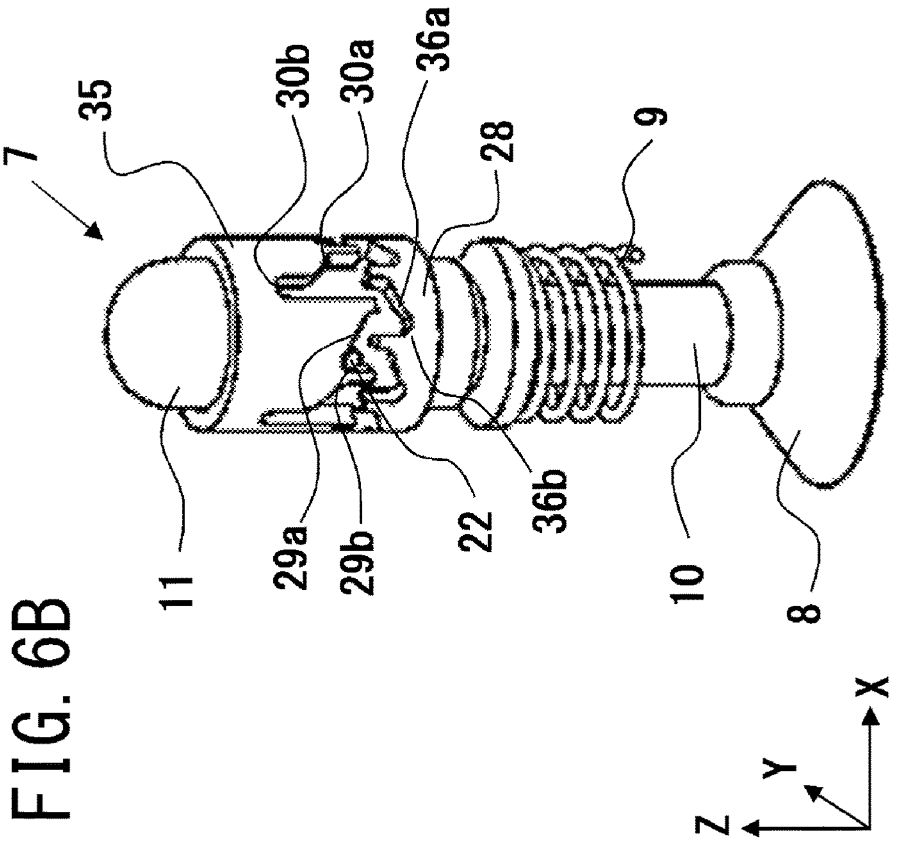

FIG. 6A is a state diagram of the valve mechanism 7 when in an open state in which the pad 8 opens the atmosphere communicating hole 4. FIG. 6B is a state diagram of the valve mechanism 7 when in a closed state in which the pad 8 closes the atmosphere communicating hole 4. In FIGS. 6A and 6B, the first attaching member 12 and the second attaching member 18 are illustrated as the corresponding internal structure 28 and internal structure 35, so that the respective states of the first guide portions 22, the first grooves 29, the second grooves 30, and the third grooves 36 can be understood.

In the present embodiment, the rod 10 is biased in the positive direction on the Z axis by the biasing force of the spring 9, and accordingly the revolver 11 is also pressed by the rod 10 and is biased in the positive direction on the Z axis. It can be seen from FIGS. 6A and 6B that the first grooves 29 each have an inclined face 29*a* that is inclined in the positive direction on the Z axis, and a retaining portion 29*b* that retains the first guide portions 22 of the revolver 11. Also, the second grooves 30 each have an inclined face 30*a* that is inclined in the positive direction on the Z axis, and a retaining portion 30*b* that retains the first guide portions 22 of the revolver 11. Also, the third grooves 36 each have an inclined face 36*a* that is inclined in the negative direction on the Z axis, and a retaining portion 36*b* that retains the first guide portions 22.

In FIG. 6A, the rod 10 is biased in the positive direction on the Z axis by the spring 9, and the revolver 11 is also biased in the positive direction on the Z axis by the rod 10. At this time, the first guide portions 22 of the revolver 11 are retained by the retaining portions 30*b* of the second grooves 30. When the revolver 11 is depressed in the negative direction on the Z axis from the state illustrated in FIG. 6A, the first guide portions 22 are released from retention with the retaining portions 30*b* and abut the inclined faces 36*a* of the third grooves 36. The first guide portions 22 then move to the retaining portions 36*b* while maintaining the abutted state with the inclined faces 36*a*, and are retained by the retaining portions 36*b*. When the revolver 11 is no longer depressed, the revolver 11 is based in the positive direction on the Z axis again. As a result, the first guide portions 22 are released from retention with the retaining portions 36*b* and abut the inclined faces 29*a* of the first grooves 29. The first guide portions 22 then move to the retaining portions 29*b* while maintaining the abutted state with the inclined faces 29*a*, and are retained by the retaining portions 29*b*, as illustrated in FIG. 6B.

In the present embodiment, the revolver 11 rotates by 22.5° about the center axis extending in the Z axis direction, from the state illustrated in FIG. 6A, the first guide portions 22 are inserted into the first grooves 29, and the spring 9 biases the revolver 11 via the rod 10. The valve mechanism 7 then switches between the open state in which the atmosphere communicating hole 4 is opened by the pad 8 and the closed state in which the atmosphere communicating hole 4 is closed, by switching between the state of FIG. 6A and the state of FIG. 6B.

Figure 7:
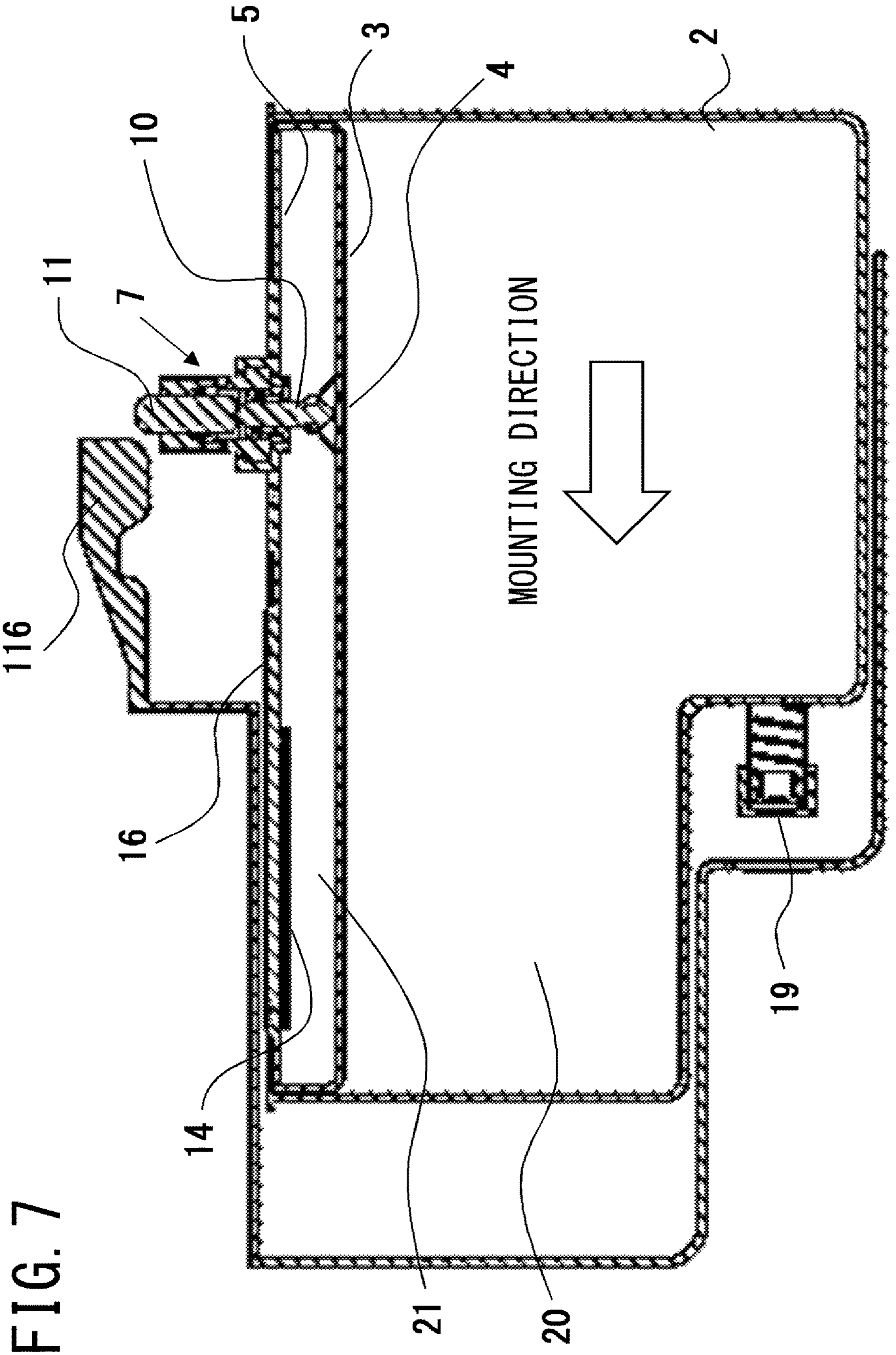
FIG. 7 is a cross-sectional view of the liquid cartridge according to the first embodiment prior to mounting.
Figure 8:
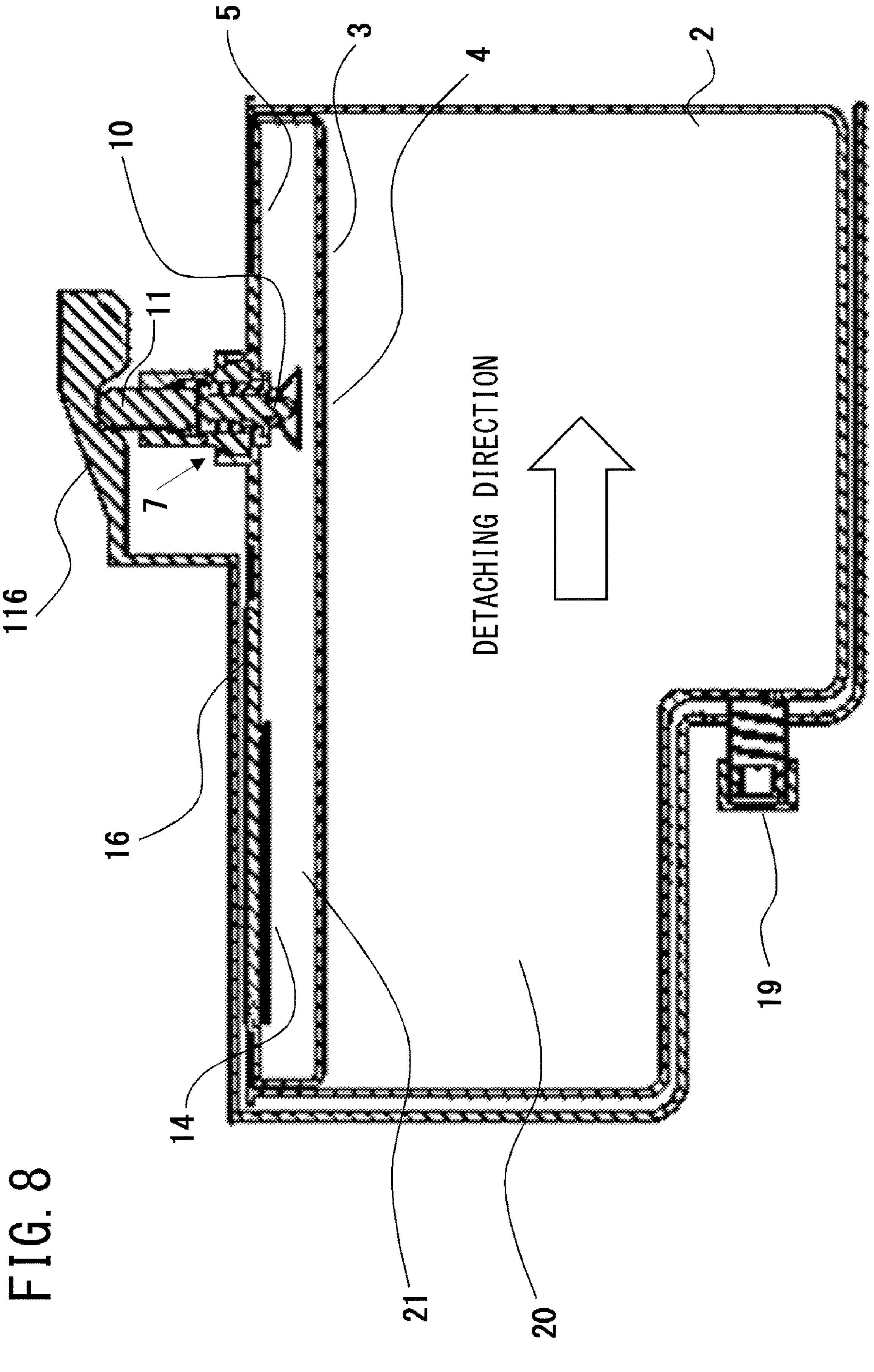
FIG. 8 is a cross-sectional view of the liquid cartridge according to the first embodiment when detached.
Figure 9A:
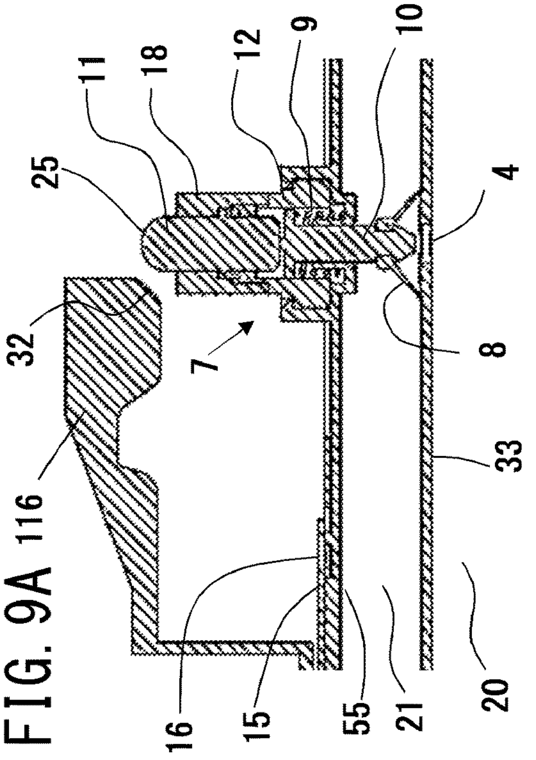
FIGS. 9A to 9C are operation diagrams of the valve mechanism prior to and following mounting of the liquid cartridge according to the first embodiment.
Figure 9B:
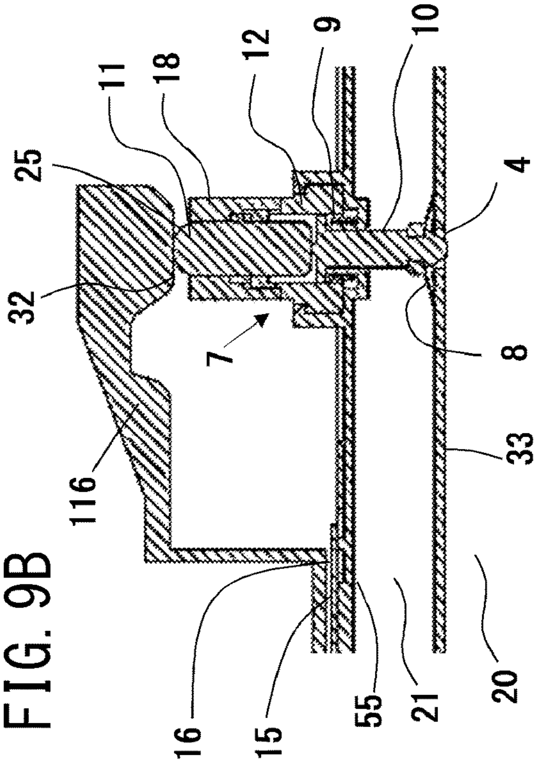
Figure 9C:
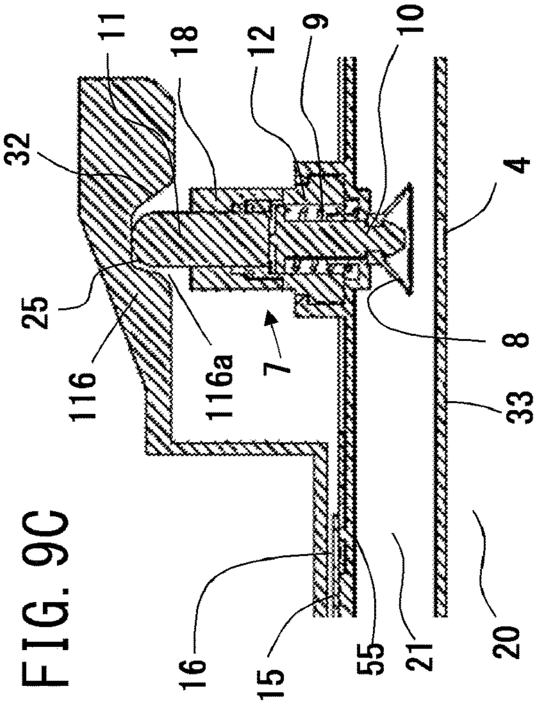

Next, an operation of mounting the liquid cartridge 1 according to the present embodiment to the recording apparatus 100, and an operation of detaching thereof from the recording apparatus 100, will be described with reference to FIGS. 7 to 11E. FIG. 7 is a cross-sectional view of the liquid cartridge 1 prior to mounting the liquid cartridge 1 to the cartridge case 116 of the recording apparatus 100. FIG. 8 is a cross-sectional view of the liquid cartridge 1 following mounting the liquid cartridge 1 to the cartridge case 116 of the recording apparatus 100. FIGS. 9A to 9C are operation change diagrams of the valve mechanism 7 at the time of mounting of the liquid cartridge 1 to the cartridge case 116. FIGS. 9A to 9C are partial cutout diagrams of the valve mechanism 7 and the surrounding parts thereof, so that details of operation changes of the valve mechanism 7 can be understood. FIGS. 9A to 9C illustrate a part 33 of the inner lid 3 and a part 55 of the upper lid 5. The liquid cartridge 1 is detachably attached to the cartridge case 116 that is a main unit part of the recording apparatus 100, by moving in a mounting direction (the direction of the arrow in FIG. 7) or in a detaching direction (the direction of the arrow in FIG. 8).

As illustrated in FIGS. 9A to 9C, the valve mechanism 7 is provided in the space 21 such that at least an end portion of the revolver 11 on an upstream side in the depressing direction (positive direction on the Z axis in FIGS. 4, 6A, 6B, etc.) is exposed to the outside of the container 2 as a pressed member. Also, the depressing direction of the pad 8, the rod 10, and the revolver 11 intersects the mounting direction and the detaching direction (mounting and detaching direction) of the liquid cartridge 1 as to the recording apparatus 100.

FIG. 9A is a state prior to mounting the liquid cartridge 1 to the cartridge case 116. In this state, the revolver 11 is retained by the retaining portions 29*b* of the first grooves 29, the atmosphere communicating hole 4 is in a closed state by the pad 8 and the rod 10, and the space 20 that is filled with ink and the space 21 that supplies the atmosphere are blocked off from each other. The distance from the first attaching member 12 to the pad 8 when the atmosphere communicating hole 4 is in the closed state in FIG. 9A is long as compared with that in FIG. 9C, which will be described later. Also, when the atmosphere communicating hole 4 is in the closed state, the space 20 that is filled with ink and the space 21 that supplies the atmosphere are blocked off from each other, and accordingly no ink is supplied from the ink supply hole 19 to the recording apparatus 100.

FIG. 9B is a state partway through mounting the liquid cartridge 1 to the cartridge case 116, in which the revolver 11 abuts the cartridge case 116 and is depressed. At this time, an abutting face 25 of the revolver 11 that abuts the cartridge case 116, and an abutting face 32 of the cartridge case 116 that abuts the revolver 11, come into contact. Now, the abutting face 32 of the cartridge case 116 acts on the revolver 11 as an acting portion, and the revolver 11 acts as an action-receiving portion. The rod 10 is depressed and moves in the vertically-downward direction in FIG. 9B, in accordance with the depressing amount of the revolver 11. Also, at this time, the closed state of the atmosphere communicating hole 4 continues to be maintained from the state in FIG. 9A by the pad 8 and the rod 10.

FIG. 9C corresponds to the state in FIG. 8 in which the liquid cartridge 1 is mounted to the cartridge case 116. When the liquid cartridge 1 is further moved in the mounting direction with respect to the cartridge case 116 from the state in FIG. 9B, the revolver 11 and the rod 10 move in the vertically-upward direction in FIG. 9C by the spring 9, following the shape of the abutting face 32. As a result, the revolver 11 is in a state of being fit into a groove portion 116*a* formed in the cartridge case 116. In this state, the revolver 11 is retained by retaining portions 30*b* of the second grooves 30, and the pad 8 and the rod 10 place the atmosphere communicating hole 4 in the open state. This realizes a state in which ink can be supplied from the ink supply hole 19 to the recording apparatus 100.

Figure 10A:
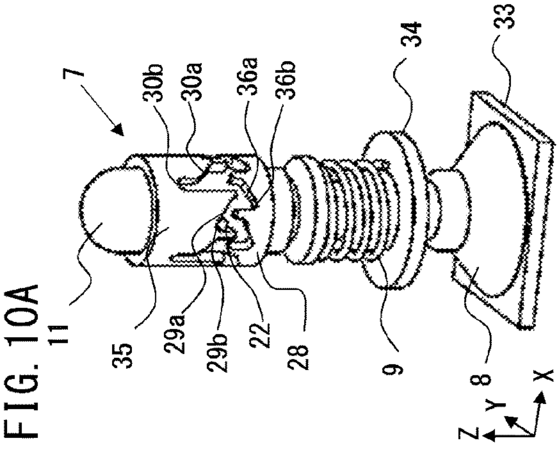
FIGS. 10A to 10E are detailed operation diagrams of the valve mechanism when mounting the liquid cartridge according to the first embodiment.

Next, details of the operation of the valve mechanism 7 when the atmosphere communicating hole 4 is switched from the closed state to the open state by the valve mechanism 7 will be described with reference to FIGS. 10A to 10E. FIG. 10A illustrates the state of the valve mechanism 7 in the state illustrated in FIG. 9A. At this time, the first guide portions 22 of the revolver 11 are retained by the retaining portions 29*b* of the first grooves 29. Accordingly, the revolver 11, and thus the pad 8 and the rod 10, are in a state of being further depressed than the state of the first guide portions 22 being retained by the retaining portions 30*b* of the second grooves 30, illustrated in FIG. 9C. Note that in the following description, the amount of depression of each of the pad 8, the rod 10, and the revolver 11, in a state of these parts being depressed as illustrated in FIG. 10A, will be referred to as a "first depressing amount".

Figure 10B:
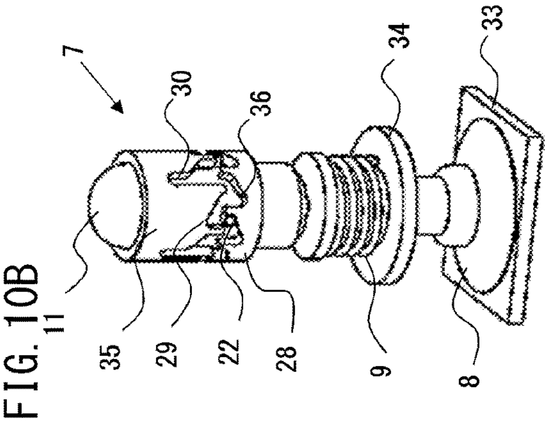
Figure 10C:
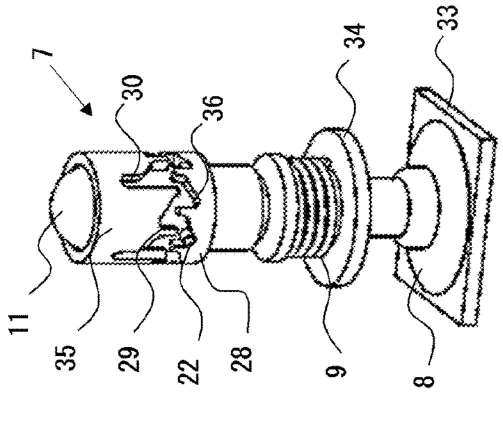

Next, when the liquid cartridge 1 is inserted into the cartridge case 116 and the revolver 11 is in a state of abutting the abutting face 32 of the cartridge case 116 as illustrated in FIG. 9B, the revolver 11 is depressed in the negative direction on the Z axis, as illustrated in FIG. 10B. At this time, the retention of the first guide portions 22 by the retaining portions 29*b* of the first grooves 29 is released, and the first guide portions 22 abut the inclined faces 36*a* of the third grooves 36. The revolver 11 then rotates centered on an axis parallel to the Z axis, and the first guide portions 22 move along the inclined faces 36*a* to the retaining portions 36*b*, as illustrated in FIG. 10C. The state of the first guide portions 22 being retained at the retaining portions 36*b* is maintained. Thus, the closed state in which the atmosphere communicating hole 4 is closed by the pad 8 is maintained. Note that in the following description, the amount of depression of each of the pad 8, the rod 10, and the revolver 11, in a state of these parts being depressed as illustrated in FIG. 10C, will be referred to as a "second depressing amount".

The pad 8 is a skirt-like elastic sealing member provided on the end portion on the side of the rod 10 that faces the atmosphere communicating hole 4, and places the atmosphere communicating hole 4 in a closed state by coming into close contact with an end face of the inner lid 3 in which the atmosphere communicating hole 4 opens, so as to surround the communicating hole. Also, when the depressing amount of the revolver 11 and the rod 10 increases, the pad 8 is made to spread wider, and thus the closed state is maintained in the second depressing amount as well.

Figure 10D:
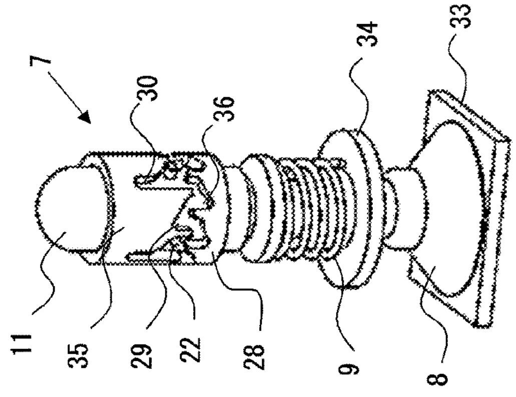
Figure 10E:
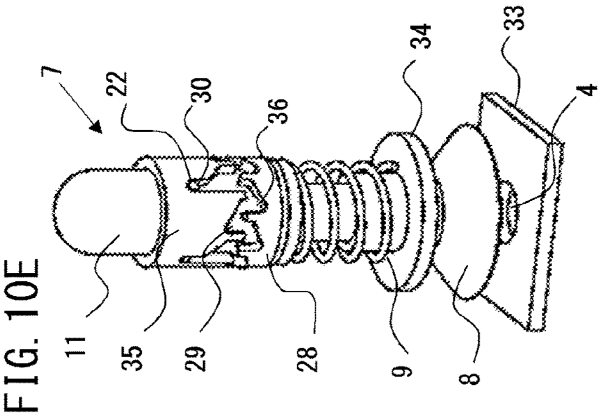

Next, as the liquid cartridge 1 moves in the mounting direction toward the inside of the cartridge case 116, the state transitions from the state in FIG. 9B to the state in FIG. 9C. At this time, the revolver 11 is pressed by the rod 10 by biasing force from the spring 9 on the rod 10 in the positive direction on the Z axis, as illustrated in FIG. 10D. At this time, the retention of the first guide portions 22 by the retaining portions 36*b* of the third grooves 36 is released, and the first guide portions 22 abut the inclined faces 30*a* of the second grooves 30. The revolver 11 then rotates centered on an axis parallel to the Z axis, and the first guide portions 22 move along the inclined faces 30*a* to the retaining portions 30*b*, as illustrated in FIG. 10E. The state in which the first guide portions 22 are retained at the retaining portions 30*b* is maintained. Thus, the state switches from the closed state in which the atmosphere communicating hole 4 is closed by the pad 8 to the open state in which the atmosphere communicating hole 4 is opened by the pad 8.

Figure 11A:
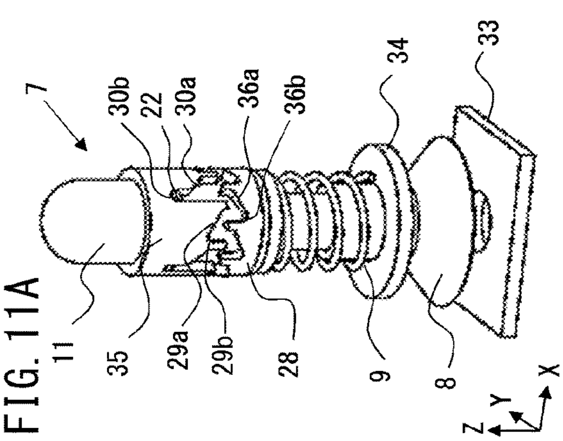
FIGS. 11A to 11E are detailed operation diagrams of the valve mechanism when detaching the liquid cartridge according to the first embodiment.

Next, details of the operation of the valve mechanism 7 when the atmosphere communicating hole 4 is switched from the open state to the closed state by the valve mechanism 7 will be described with reference to FIGS. 11A to 11E. FIG. 11A illustrates the state of the valve mechanism 7 in the state illustrated in FIG. 9C, and corresponds to the state thereof illustrated in FIG. 10E. At this time, the first guide portions 22 of the revolver 11 are retained at the retaining portions 30*b* of the second grooves 30. Thus, the atmosphere communicating hole 4 is maintained in an open state by the pad 8.

Figure 11B:
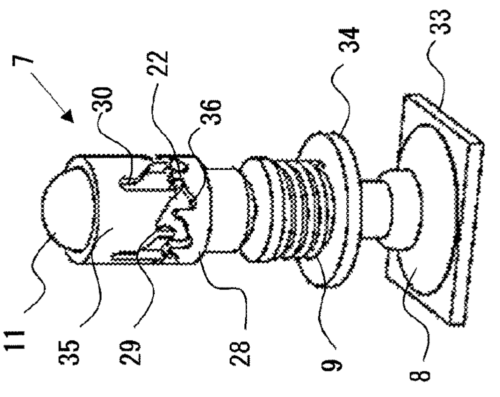

Next, the liquid cartridge 1 is detached from the cartridge case 116, and the state transitions from the state illustrated in FIG. 9C to the state illustrated in FIG. 9B. The revolver 11 is depressed by the abutting face 32 of the cartridge case 116 as illustrated in FIG. 9B, and the revolver 11 is depressed in the negative direction on the Z axis. At this time, the magnitude of the depressing amount of the revolver 11 is the second depressing amount. Accordingly, the retention of the first guide portions 22 by the retaining portions 30*b* of the second grooves 30 is released, and the first guide portions 22 abut the inclined faces 36*a* of the third grooves 36, as illustrated in FIG. 11B. As a result, the open/closed state of the atmosphere communicating hole 4 by the pad 8 switches from the open state to the closed state.

Figure 11C:
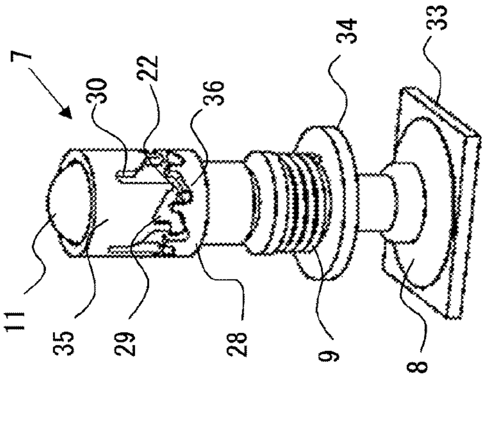

The revolver 11 then rotates centered on an axis parallel to the Z axis, and the first guide portions 22 move along the inclined faces 36*a* to the retaining portions 36*b*, as illustrated in FIG. 11C. The state of the first guide portions 22 being retained at the retaining portions 36*b* is maintained. Thus, the closed state in which the atmosphere communicating hole 4 is closed by the pad 8 is maintained.

Figure 11D:
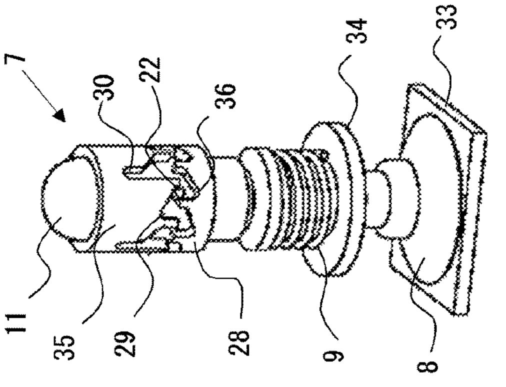
Figure 11E:
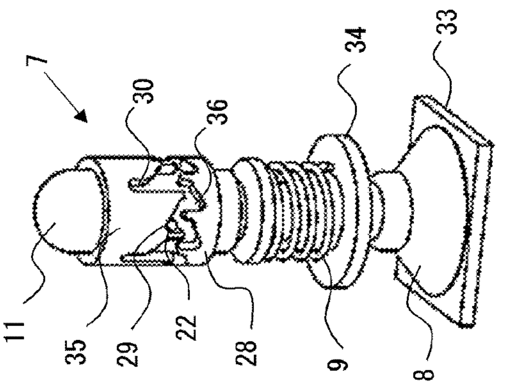

Next, when the liquid cartridge 1 is further moved in the detaching direction, the action of the abutting face 32 of the cartridge case 116 no longer acts on the revolver 11, and the state transitions from the state in FIG. 9B to the state in FIG. 9A. At this time, the revolver 11 is pressed by the rod 10 by biasing force from the spring 9 on the rod 10 in the positive direction on the Z axis, as illustrated in FIG. 11D. The retention of the first guide portions 22 by the retaining portions 36*b* of the third grooves 36 is released, and the first guide portions 22 abut the inclined faces 29*a* of the first grooves 29. The revolver 11 then rotates centered on an axis parallel to the Z axis, and the first guide portions 22 move along the inclined faces 29*a* to the retaining portions 29*b*, as illustrated in FIG. 11E. The state in which the first guide portions 22 are retained at the retaining portions 29*b*, i.e., the state in which the magnitude of the depressing amount of the pad 8, the rod 10, and the revolver 11 is the first depressing amount, is maintained. Also, the closed state in which the atmosphere communicating hole 4 is closed by the pad 8 is maintained.

As described above, in the present embodiment, the depressing amount of the pad 8, the rod 10, and the revolver 11 is the second depressing amount that is greater than the first depressing amount, as illustrated in FIGS. 11A and 111B. At this time, the state of the pad 8, the rod 10, and the revolver 11 changes from the open state of opening the atmosphere communicating hole 4 to the closed state of closing the atmosphere communicating hole 4, and the closed state is maintained. Also, opposing regions of the first, second, and third grooves 29, 30, 36 function as restricting portions that restrict the movable range of the pad 8, the rod 10, and the revolver 11. Also, due to the first, second, and third grooves 29, 30, 36 being disposed in the circumferential direction of the internal structure 28, the first, second, and third grooves 29, 30, 36 also function as a switching mechanism that enables the range of restricting the movable range by these restricting portions to be switched. More specifically, the first grooves 29 and the third grooves 36 function as first restricting portions that restrict the movable range of the pad 8, the rod 10, and the revolver 11 to a first movable range in which the closed state is maintained regardless of the magnitude of the depressing amount. Also, the second grooves 30 and the third grooves 36 function as second restricting portions that restrict the movable range of the pad 8, the rod 10, and the revolver 11 to a second movable range in which either the open state or the closed state can be assumed. When the depressing amount is the second depressing amount, the first guide portions 22 and the first, second, and third grooves 29, 30, 36 switch the restriction of the movable range by the restricting portions between a first restricting state by the first restricting portions and a second restricting state by the second restricting portions. Note that the first, second, and third grooves 29, 30, 36 can switch from one to the other of the first restricting state by the first restricting portions and the second restricting state by the second restricting portions, and from the other to the one.

Also, the first attaching member 12 and the second attaching member 18 are guide supporting members that movably support the pad 8, the rod 10, and the revolver 11 along the depressing direction. A guide hole is formed by these guide supporting members, extending in the depressing direction of insertion of the pad 8, the rod 10, and the revolver 11. Also, the first, second, and third grooves 29, 30, 36 form restricting grooves, annularly provided on an inner circumferential face of the guide hole, into which the first guide portions 22 are fit.

Also, the first, second, and third grooves 29, 30, 36 have groove lateral surfaces that are opposing in a direction along the depressing direction. The opposing groove lateral surfaces include the first restricting portions and the second restricting portions. More specifically, the first grooves 29 and the third grooves 36, which are the first restricting portions, are opposed over a first spacing in the direction in the depressing direction of the pad 8, the rod 10, and the revolver 11, by which the closed state of the atmosphere communicating hole 4 can be maintained regardless of the magnitude of the depressing amount. Now, the first spacing is the spacing between the first grooves 29 and the third grooves 36 by which the closed state of the atmosphere communicating hole 4 can be maintained by the pad 8 when the first guide portions 22 are retained by the retaining portions 29*b* of the first grooves 29. A region where the first grooves 29 and the third grooves 36 are opposed across this first spacing corresponds to a first opposing region.

Also, the second grooves 30 and the third grooves 36, which are the second restricting portions, are opposed over a second spacing in a direction in the depressing direction of the pad 8, the rod 10, and the revolver 11, which is wider than the above first spacing. Now, the second spacing is the spacing between the second grooves 30 and the third grooves 36 by which the opened state of the atmosphere communicating hole 4 can be maintained by the pad 8 when the first guide portions 22 are retained by the retaining portions 30*b* of the second grooves 30. A region where the second grooves 30 and the third grooves 36 are opposed across this second spacing corresponds to a second opposing region.

The revolver 11 rotates about an axis of rotation that extends in the depressing direction (Z axis direction) through the guide hole, with the first guide portions 22 being guided by the restricting grooves formed by the first, second, and third grooves 29, 30, 36. The positions at which the first guide portions 22 fit to these restricting grooves then change in the circumferential direction about the axis of rotation, thereby changing the restriction state of the movable range.

Also, the first, second, and third grooves 29, 30, 36 are disposed such that the first opposing region and the second opposing region are alternately repeated in the circumferential direction about the axis of rotation. Accordingly, the valve mechanism 7 repeats change from the state in FIG. 10A to the state in FIG. 10E, and change from the state in FIG. 11A to the state in FIG. 11E, by the pad 8, the rod 10, and the revolver 11 being depressed as described above. Consequently, each time a depression operation of the pad 8, the rod 10, and the revolver 11 occurring, the closed state and the open state of the atmosphere communicating hole 4 are repeated. Also, the inclined faces 29*a*, 30*a*, and 36*a* that are inclined with respect to the circumferential direction are provided between the first opposing region and the second opposing region of the first, second, and third grooves 29, 30, 36. Accordingly, the inclined faces 29*a*, 30*a*, and 36*a* impart the first guide portions 22 with force to rotate the revolver 11 in one rotation direction about the axis of rotation.

Also, when the liquid cartridge 1 is detached from the recording apparatus 100, the movable range of the pad 8, the rod 10, and the revolver 11 is restricted to the first movable range. Also, when the liquid cartridge 1 is mounted to the recording apparatus 100, the movable range of the pad 8, the rod 10, and the revolver 11 is restricted to the second movable range, and the pad 8 is maintained in the open state by the biasing force of the spring 9.

According to the liquid cartridge 1 having the valve mechanism 7 according to the present embodiment, a user of the liquid cartridge 1 can perform switching of the open/closed states of the atmosphere communicating hole 4 by the work of mounting the liquid cartridge 1 to the recording apparatus 100, without the trouble of manual operation. Also, the open/closed states of the atmosphere communicating hole 4 are switched in accordance with mounting and detaching the liquid cartridge 1 to and from the recording apparatus 100. Accordingly, even in a case of detaching the liquid cartridge 1 mounted to the recording apparatus 100 from the recording apparatus 100, ink is prevented from leaking out from the atmosphere communicating hole 4, since the atmosphere communicating hole 4 is in a closed state.

Second Embodiment

Next, a liquid cartridge 200 according to a second embodiment will be described. Note that in the present embodiment, configurations that are the same as in the first embodiment are denoted by the same signs, and detailed description thereof will be omitted.

Figure 12:
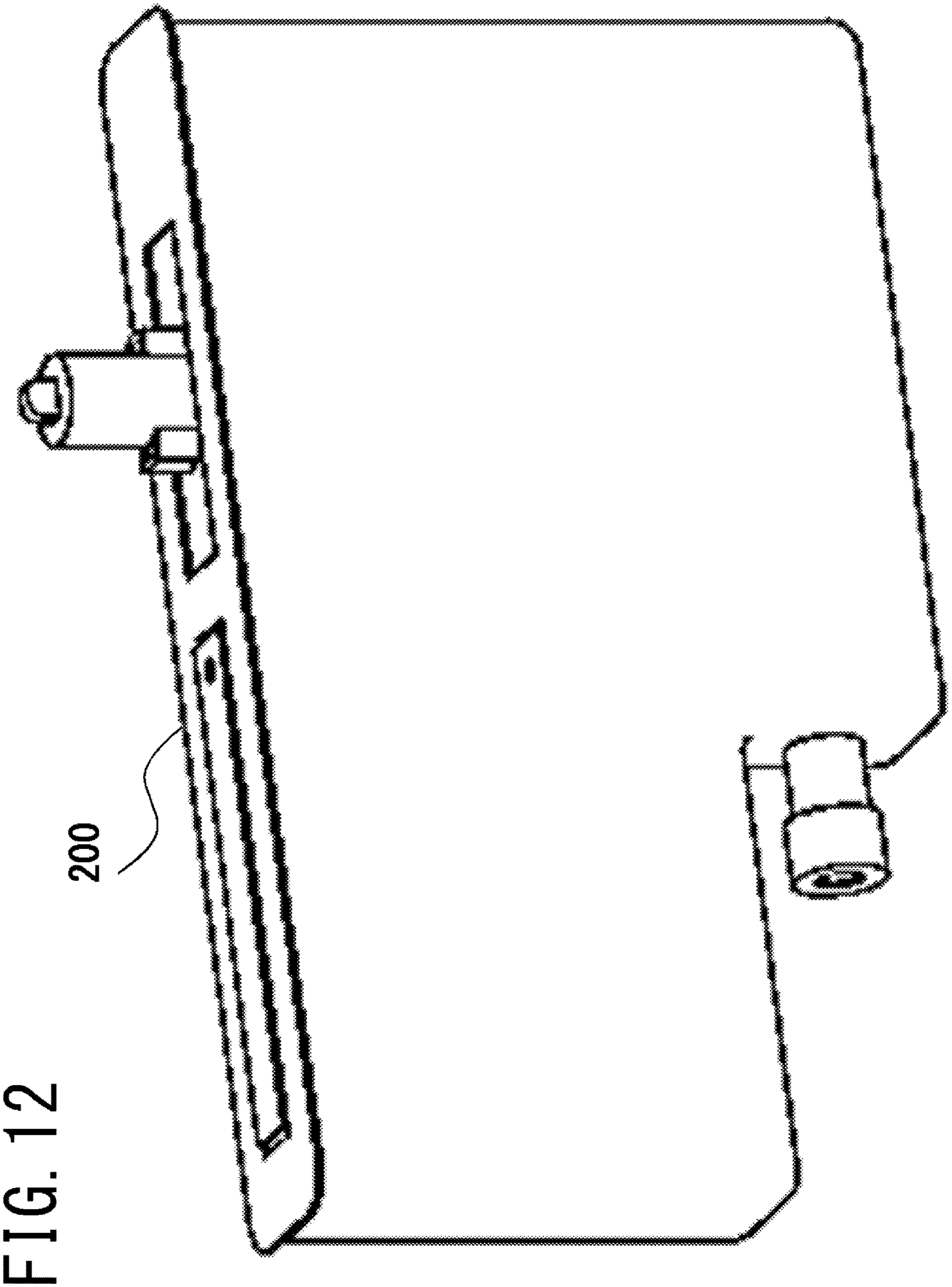
FIG. 12 is an external view of a liquid cartridge according to a second embodiment.
Figure 13:
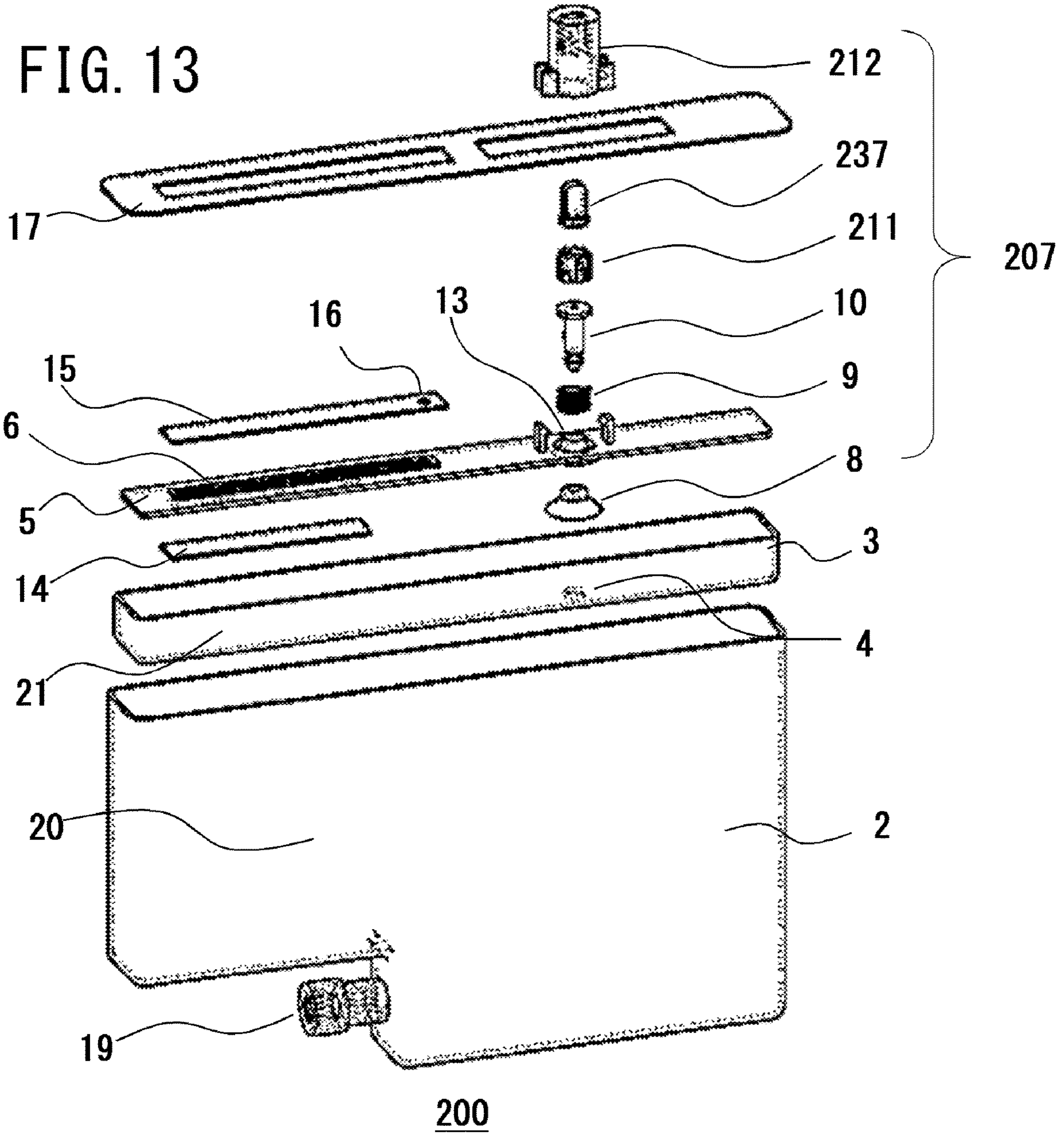
FIG. 13 is a disassembled view of the liquid cartridge according to the second embodiment.

FIG. 12 is an external view of the liquid cartridge 200 according to the present embodiment. FIG. 13 is a disassembled view of the liquid cartridge 200. Differences as to the first embodiment are that a button 237 is provided to a valve mechanism 207, and that a first attaching member 212 is configured as an integrated member of the first attaching member 12 and the second attaching member 18 according to the first embodiment.

Figure 14:
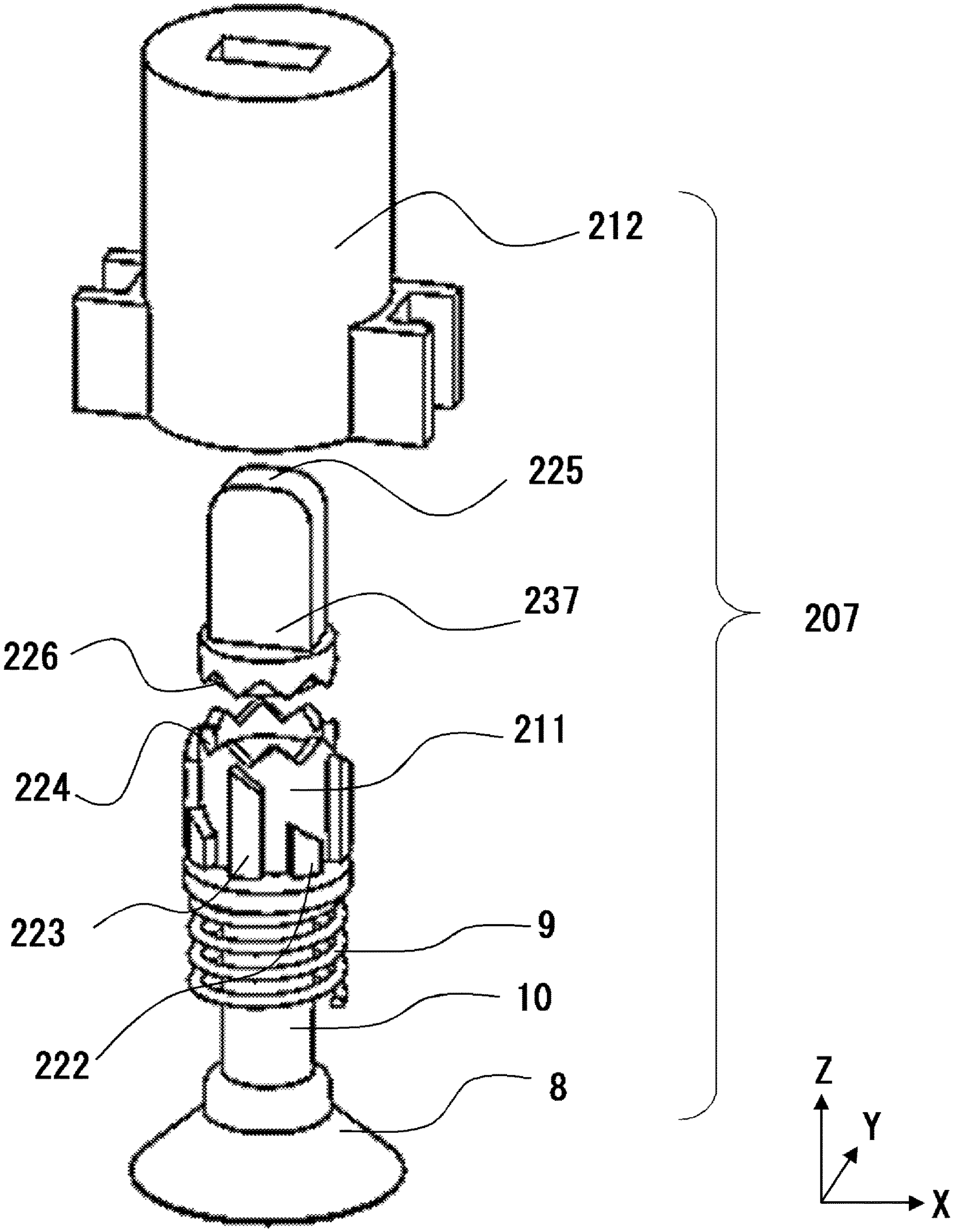
FIG. 14 is a detailed explanatory diagram of a valve mechanism according to the second embodiment.

FIG. 14 is a detailed explanatory diagram of the valve mechanism 207 according to the present embodiment. The valve mechanism 207 is made of the pad 8 formed of rubber, the spring 9, the rod 10, a revolver 211, and the button 237. The tip end of the rod 10 passes through the spring 9 and a rod shaft hole 213 of the upper lid 5 that is omitted from illustration, and is fit into the pad 8. Further, the first attaching member 212 is fixed to the upper lid 5 that is omitted from illustration, thereby sandwiching the revolver 211 and the button 237 between the first attaching member 212 and the rod 10.

The button 237 functions as a pressed member, and has an abutting face 225 and first sawteeth 226. The first sawteeth 226 function as a first concave and convex portion provided on an end portion of the button 237, on a downstream side (negative direction side on Z axis) thereof in the depressing direction. Also, first guide portions 222, second guide portions 223, and second sawteeth 224 are provided on the revolver 211. The first guide portions 222 and the second guide portions 223 are provided on the circumferential direction about the axis of rotation of the revolver 211, alternatingly and equidistantly. The second sawteeth 224 are provided at an end portion facing the button 237, and function as a second concave and convex portion capable of engaging the first sawteeth 226. Thus, the second sawteeth 224 of the revolver 211 and the first sawteeth 226 of the button 237 are shaped so as to be capable of meshing with each other. Also, tips of the first guide portions 222 and of the second guide portions 223 in the positive direction side of the Z axis are obliquely cut shapes. The first guide portions 222 and the second guide portions 223 function as a third concave and convex portion provided on the perimeter of the second sawteeth 224. Also, the revolver 211 functions as a transmission member disposed between the button 237 and the pad 8 and rod 10 that serve as a valve element.

Figure 15A:
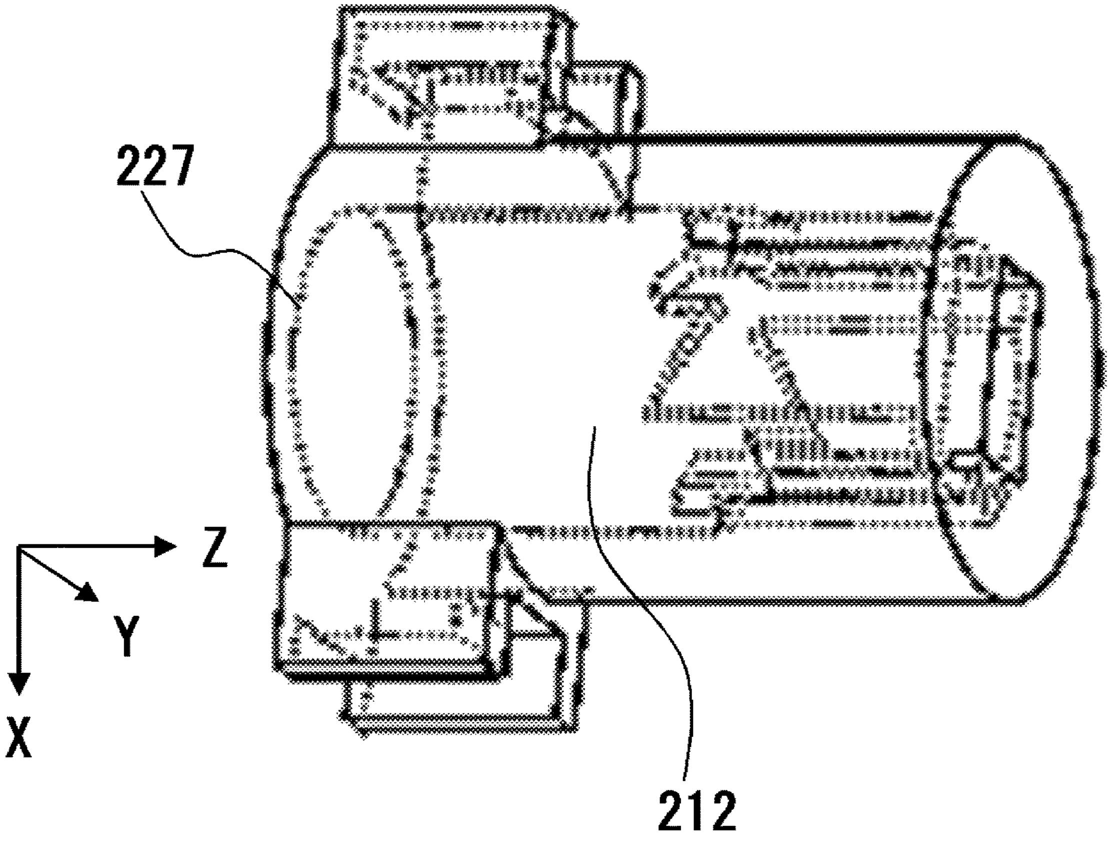
FIGS. 15A and 15B are internal structure diagrams of an attaching member according to the second embodiment.
Figure 15B:
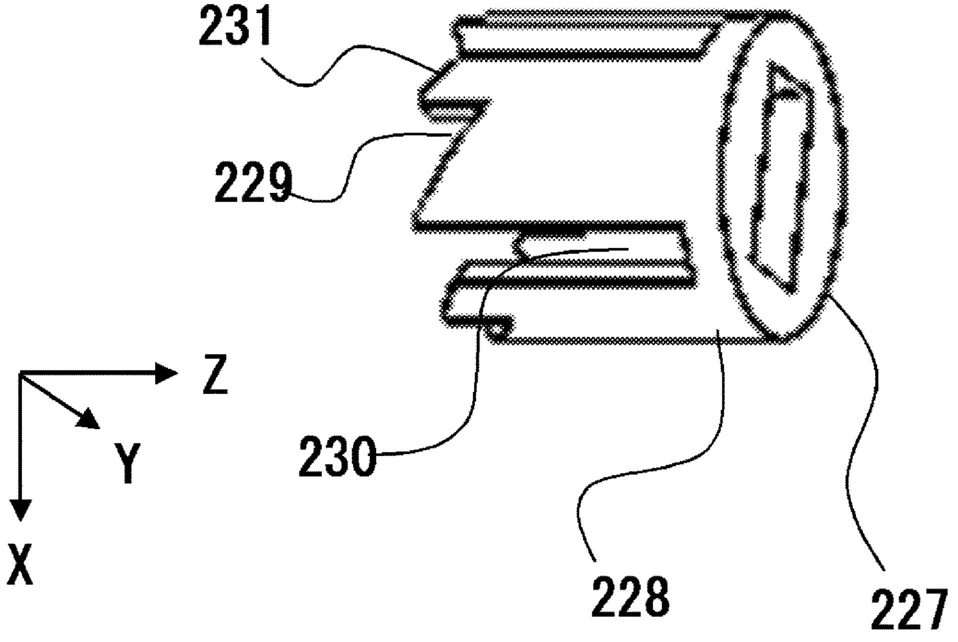

Next, FIG. 15A is a diagram illustrating the first attaching member 212, and FIG. 15B is a diagram illustrating part of an internal structure 228 of the first attaching member 212. Note that in FIG. 15B, part of the internal structure 228 of the first attaching member 212 is omitted. Specifically, an outer-side portion of the first attaching member 212 is omitted from the internal structure 228 of the first attaching member 212 with a cylinder inner diameter 227 of the first attaching member 212 as the boundary thereof. The first attaching member 212 functions as a guide supporting member that movably supports the button 237, the revolver 211, the rod 10, and the pad 8 in the depressing direction. Also, the internal structure 228 of the first attaching member 212 forms a guide hole, extending in the depressing direction of insertion of the button 237, the revolver 211, the rod 10, and the pad 8.

As illustrated in FIG. 15B, on an inner circumferential face of the internal structure 228 of the first attaching member 212, first grooves 229 and second grooves 230 are provided disposed alternatingly within the cylinder inner diameter 227. Spacing between the first grooves 229 and the second grooves 230, and spacing between the first guide portions 222 and the second guide portions 223, are the same. Also, the first guide portions 222 and the second guide portions 223 are capable of smoothly entering the grooves of each of the first grooves 229 and the second grooves 230. The bottoms of the first grooves 229 are cut obliquely so as to correspond to the inclination of the obliquely cut tip end shapes of the first guide portions 222 and the second guide portions 223. Also, protruding-portion bottom faces 231 between the first grooves 229 and the second grooves 230 are also cut obliquely so as to correspond to the inclination of the tip end shapes of the first guide portions 222 and the second guide portions 223. The first grooves 229 and the second grooves 230 function as a fourth concave and convex portion that is capable of engaging the first guide portions 222 and the second guide portions 223.

The button 237, the revolver 211, and the rod 10 are capable of moving in the Z axis direction within the cylinder inner diameter 227 of the first attaching member 212. Also, the first guide portions 222 and the second guide portions 223 are not inserted into the first grooves 229 and the second grooves 230, and the first sawteeth 226 of the button 237 and the second sawteeth 224 are in an unmeshed state. The revolver 211 is configured to be rotatable within the cylinder inner diameter 227 of the first attaching member 212.

Figure 16B:
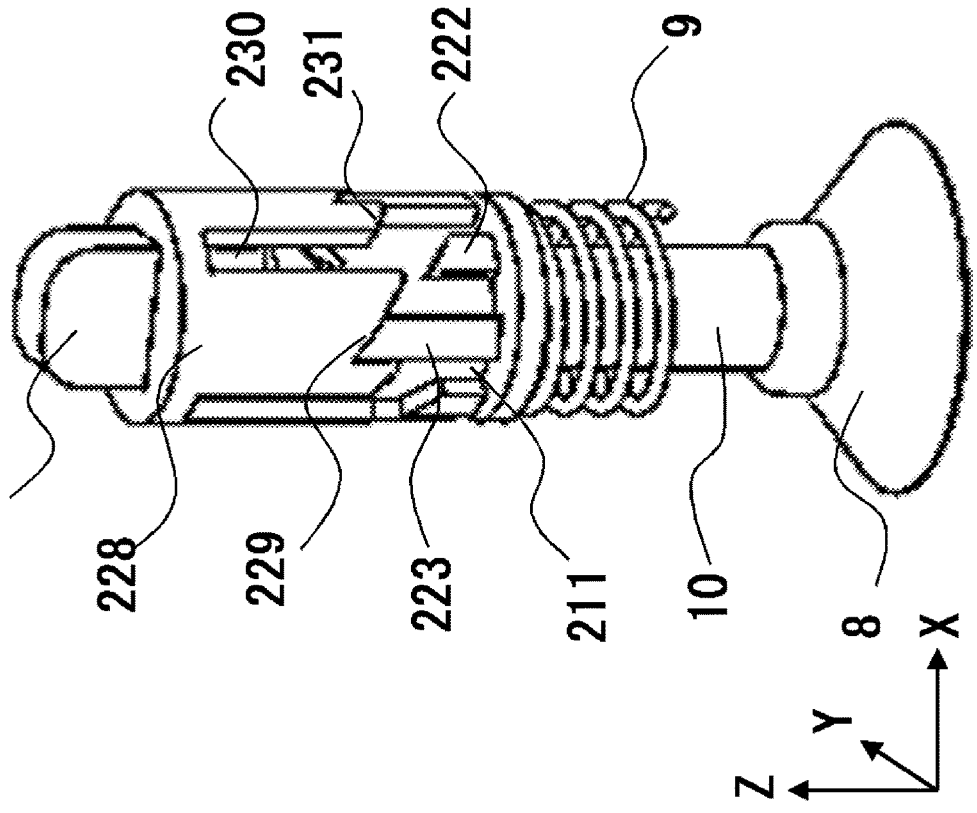
FIGS. 16A and 16B are state diagrams illustrating open/closed states of the valve mechanism according to the second embodiment.
Figure 16A:
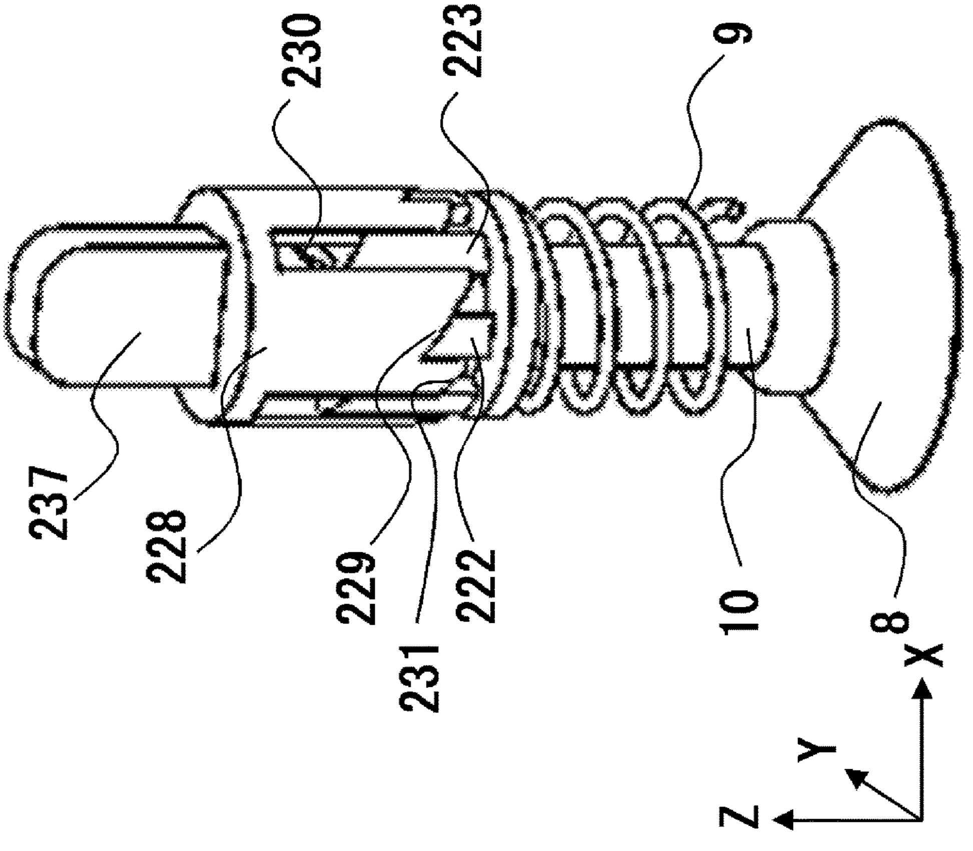

FIG. 16A is a state diagram of the valve mechanism 207 when the pad 8 is opening the atmosphere communicating hole 4. FIG. 16B is a state diagram of the valve mechanism 207 in a closed state in which the pad 8 closes the atmosphere communicating hole 4. Only the internal structure 228 is illustrated in FIGS. 16A and 16B with respect to the first attaching member 212, so that the correlation between the first guide portions 222 and second guide portions 223, and the first grooves 229 and the second grooves 230 can be understood. In FIG. 16A, the first guide portions 222 are inserted into the first grooves 229, the second guide portions 223 are inserted into the second grooves 230, and the spring 9 is biasing the revolver 211 via the rod 10. In FIG. 16B, the revolver 211 has rotated from the state in FIG. 16A by an angle corresponding to the spacings between the first guide portions 222 and the second guide portions 223, the second guide portions 223 are inserted into the first grooves 229, and the spring 9 is biasing the revolver 211 via the rod 10. The open/closed state of the atmosphere communicating hole 4 is switched by change in the distance from the first attaching member 212 to the pad 8, which occurs due to difference in the deep meshing state in FIG. 16A and the shallow meshing state in FIG. 16B.

Figure 17:
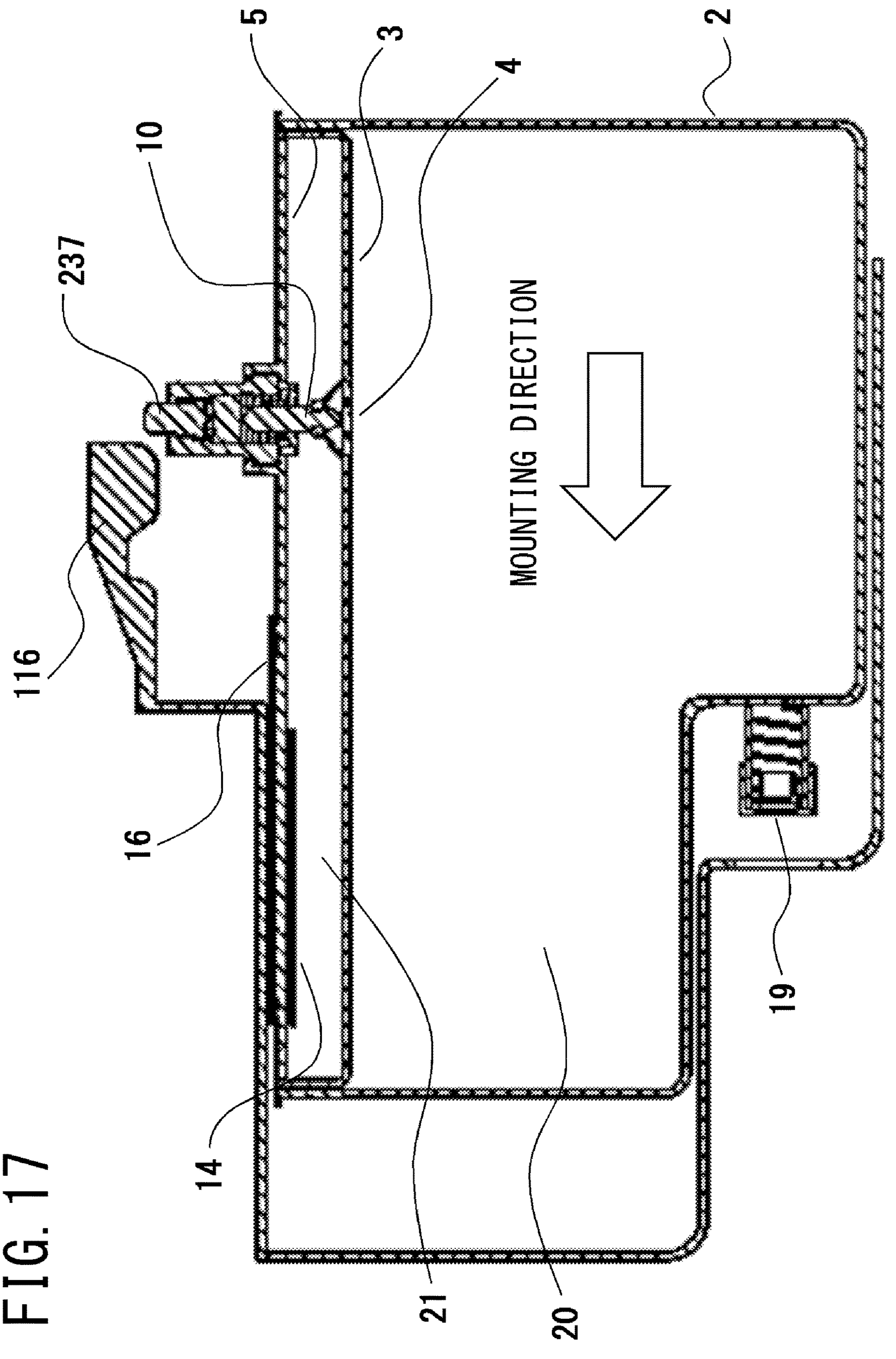
FIG. 17 is a cross-sectional view of the liquid cartridge according to the second embodiment prior to mounting.
Figure 18:
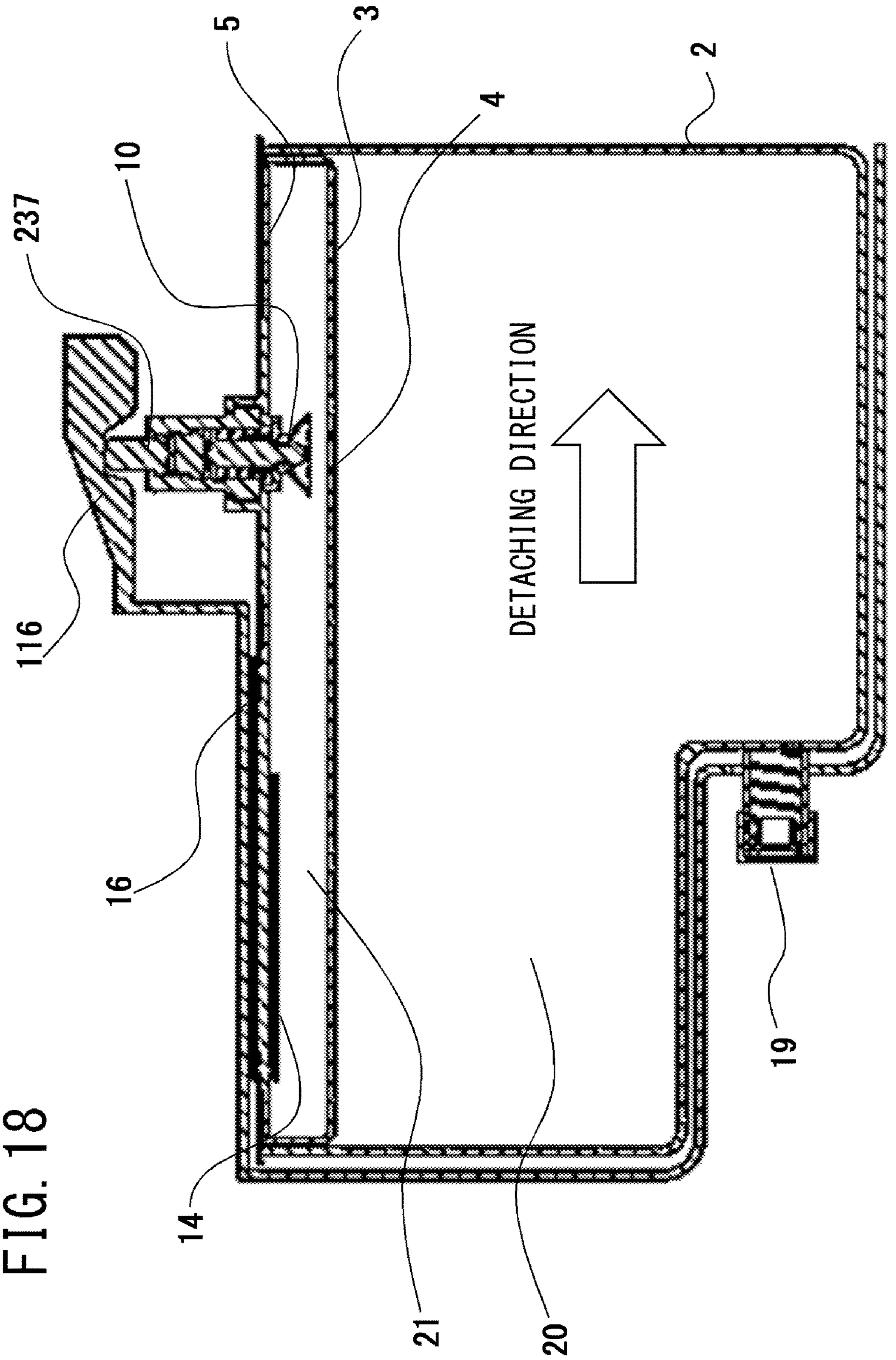
FIG. 18 is a cross-sectional view of the liquid cartridge according to the second embodiment when detached.
Figure 19A:
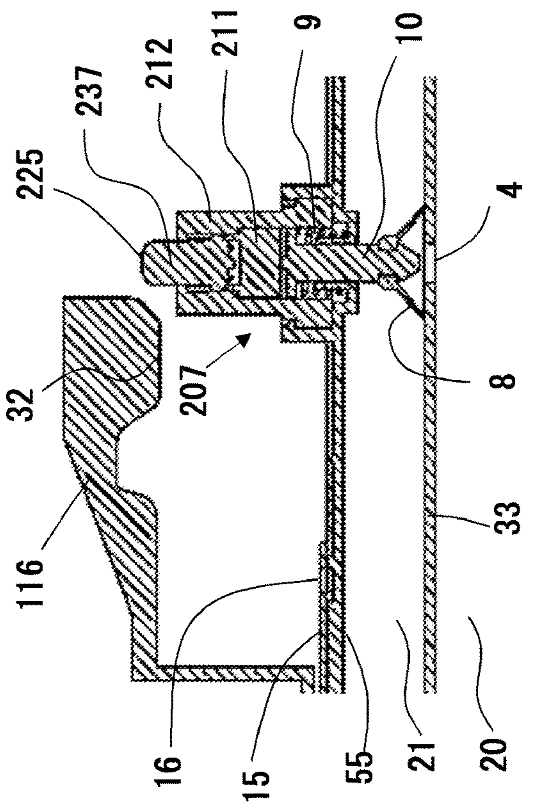
FIGS. 19A to 19C are operation diagrams of the valve mechanism prior to and following mounting of the liquid cartridge according to the second embodiment.
Figure 19B:
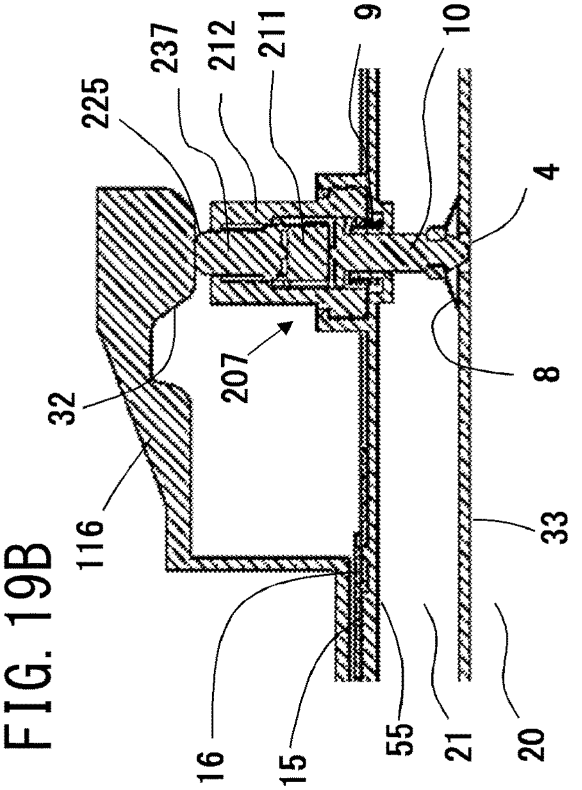
Figure 19C:
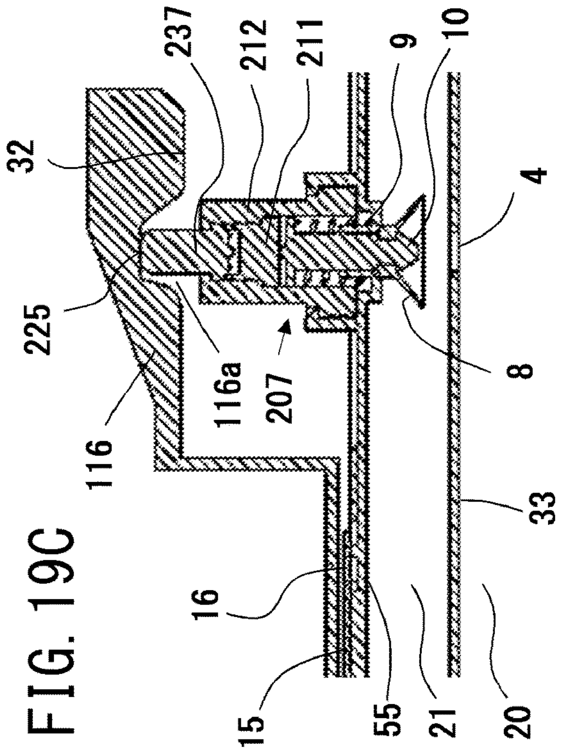

Next, an operation of mounting the liquid cartridge 200 according to the present embodiment to the recording apparatus 100, and an operation of detaching from the recording apparatus 100, will be described with reference to FIGS. 17 to 21E. FIG. 17 is a cross-sectional view of the liquid cartridge 200 when mounting the liquid cartridge 200 to the cartridge case 116 of the recording apparatus 100. Also, FIG. 18 is a cross-sectional view when detaching the liquid cartridge 200 from the cartridge case 116 of the recording apparatus 100. FIGS. 19A to 19C are diagrams illustrating operation changes of the valve mechanism 207 when mounting and detaching the liquid cartridge 200. FIGS. 19A to 19C are partial cutout diagrams of the valve mechanism 207 and the surrounding parts thereof, so that details of operation changes of the valve mechanism 207 can be understood. FIGS. 19A to 19C illustrate part 33 of the inner lid 3 and part 55 of the upper lid 5. The liquid cartridge 200 is detachably attached to the cartridge case 116 that is a main unit part of the recording apparatus 100, by moving in a mounting direction (the direction of the arrow in FIG. 17) or in a detaching direction (the direction of the arrow in FIG. 18).

FIG. 19A is a state prior to mounting the liquid cartridge 200 to the cartridge case 116. In this state, the revolver 211 is retained by the first grooves 229, the atmosphere communicating hole 4 is in a closed state by the pad 8 and the rod 10, and the space 20 that is filled with ink and the space 21 that supplies the atmosphere are blocked off from each other. In the state in FIG. 19A, the second guide portions 223 are inserted in the first grooves 229 in the valve mechanism 207. At this time, the first sawteeth 226 of the button 237 and the second sawteeth 224 of the revolver 211 are not meshed with each other, and the teeth are offset from each other by a half-pitch. Also, the distance from the first attaching member 212 to the pad 8 when the atmosphere communicating hole 4 is in the closed state in FIG. 19A is long as compared with that in FIG. 19C, which will be described later. Also, when the atmosphere communicating hole 4 is in the closed state, the space 20 that is filled with ink and the space 21 that supplies the atmosphere are blocked off from each other, and accordingly no ink is supplied from the ink supply hole 19 to the recording apparatus 100.

FIG. 19B is a state partway through mounting the liquid cartridge 200 to the cartridge case 116, in which the revolver 211 abuts the cartridge case 116 and is depressed. At this time, the abutting face 225 of the revolver 211 that abuts the cartridge case 116, and the abutting face 32 of the cartridge case 116 that abuts the revolver 211, come into contact. Now, the abutting face 32 of the cartridge case 116 acts on the revolver 211 as an acting portion, and the revolver 211 acts as an action-receiving portion. The rod 10 then moves by being depressed in the vertically-downward direction, in accordance with the depressing amount of the revolver 211. Also, at this time, the closed state of the atmosphere communicating hole 4 continues to be maintained from the state in FIG. 19A by the pad 8 and the rod 10.

FIG. 19C corresponds to the state in FIG. 18 in which the liquid cartridge 200 is mounted to the cartridge case 116. When the liquid cartridge 200 is further moved in the mounting direction with respect to the cartridge case 116 from the state in FIG. 19B, the revolver 211 and the rod 10 move in the vertically-upward direction in FIG. 19C by the spring 9, following the shape of the abutting face 32. As a result, the revolver 211 is in a state of being fit into the groove portion 116*a* formed in the cartridge case 116. In this state, the revolver 211 is retained by the second grooves 230, and the pad 8 and the rod 10 place the atmosphere communicating hole 4 in the open state. This realizes a state in which ink can be supplied from the ink supply hole 19 to the recording apparatus 100.

Figures 20A, 20B, 20C, 20D, 20E:
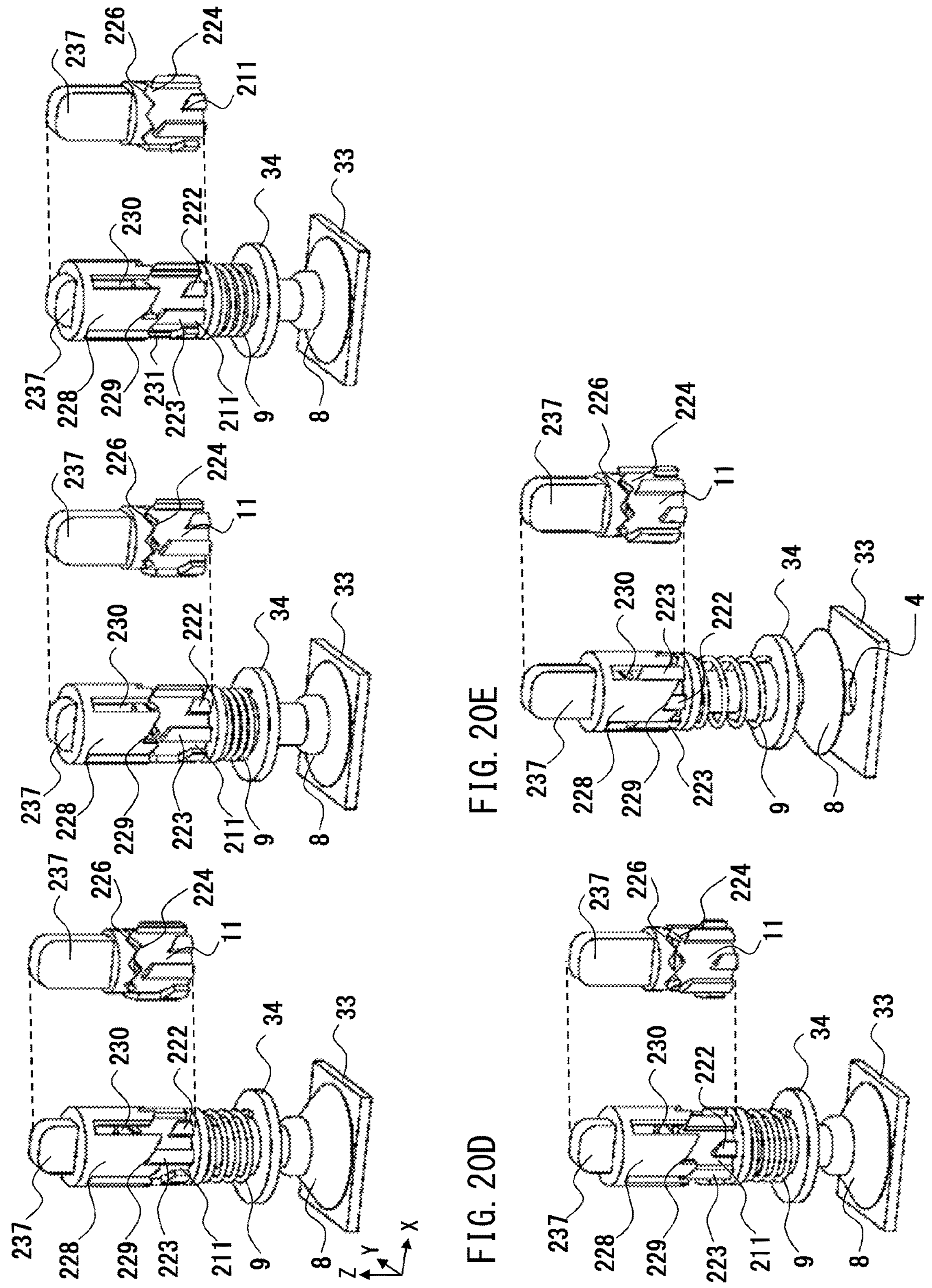
FIGS. 20A to 20E are detailed operation diagrams of the valve mechanism when mounting the liquid cartridge according to the second embodiment.

Next, details of the operation of the valve mechanism 207 when the atmosphere communicating hole 4 is switched from the closed state to the open state by the valve mechanism 207 will be described with reference to FIGS. 20A to 20E. FIG. 20A illustrates the state of the valve mechanism 207 in the state illustrated in FIG. 19A. At this time, the second guide portions 223 of the revolver 211 are retained by the first grooves 229. Accordingly, the revolver 211, and thus the pad 8 and the rod 10, are in a state of being further depressed than the state of the first guide portions 222 being retained by the first grooves 229, illustrated in FIG. 19C.

Next, the liquid cartridge 200 is inserted into the cartridge case 116, and the revolver 211 is in a state of abutting the abutting face 32 of the cartridge case 116 as illustrated in FIG. 19B. Also, the button 237 and the revolver 211 are depressed in the negative direction on the Z axis, as illustrated in FIG. 20B. At this time, the retention of the second guide portions 223 by the first grooves 229 is released. Due to the retention of the second guide portions 223 by the first grooves 229 being released, the revolver 211 is free to rotate. Then, as illustrated in FIG. 20C, the revolver 211 rotates by a half-pitch of the sawteeth, so that the first sawteeth 226 of the button 237 and the second sawteeth 224 of the revolver 211 mesh. The revolver 211 is biased to the button 237 side (positive side on the Z axis) by the spring 9, and accordingly the second sawteeth 224 and the first sawteeth 226 of the button 237 mesh as the revolver 211 rotates. The second guide portions 223 then abut the protruding-portion bottom faces 231, thereby maintaining the closed state in which the atmosphere communicating hole 4 is closed by the pad 8.

Next, as the liquid cartridge 200 moves in the mounting direction toward the inside of the cartridge case 116, the state transitions from the state in FIG. 19B to the state in FIG. 19C. At this time, the revolver 211 is pressed by the rod 10 by biasing force from the spring 9 on the rod 10 in the positive direction on the Z axis, as illustrated in FIG. 20D. When changing from the state in FIG. 20C to the state in FIG. 20D, the revolver 211 rotates under the biasing by the spring 9, in a state in which the second guide portions 223 abut the protruding-portion bottom faces 231. The revolver 211 then rotates centered on an axis parallel to the Z axis, the second guide portions 223 are inserted into the second grooves 230, and the first guide portions 222 are retained by the first grooves 229, as illustrated in FIG. 20E. Thus, the state switches from the closed state in which the atmosphere communicating hole 4 is closed by the pad 8 to the open state in which the atmosphere communicating hole 4 is opened by the pad 8.

Figures 21A, 21B, 21C, 21D, 21E:
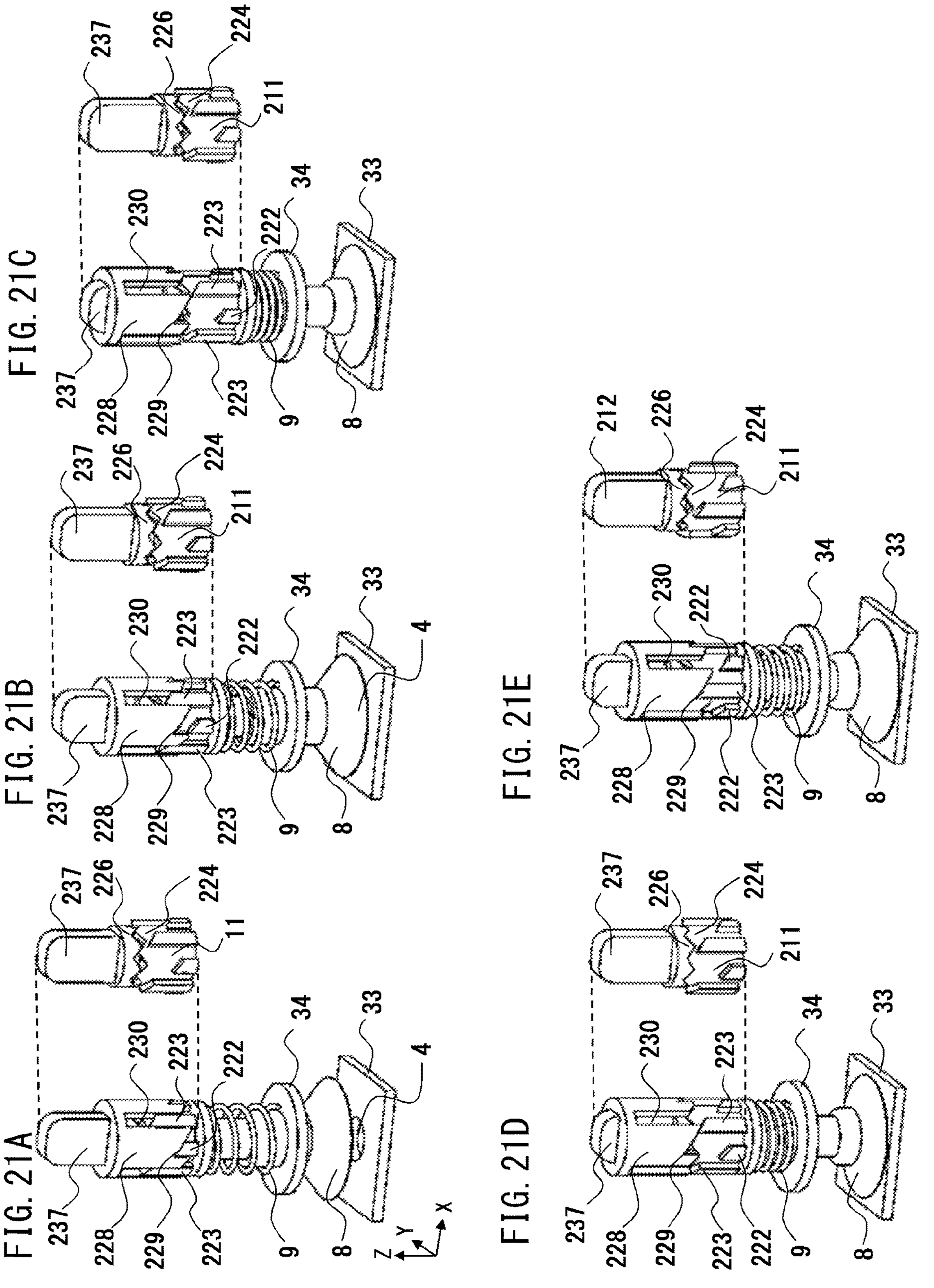
FIGS. 21A to 21E are detailed operation diagrams of the valve mechanism when detaching the liquid cartridge according to the second embodiment.

Next, details of the operation of the valve mechanism 207 when the atmosphere communicating hole 4 is switched from the open state to the closed state by the valve mechanism 207 will be described with reference to FIGS. 21A to 21E. FIG. 21A illustrates the state of the valve mechanism 207 in the state illustrated in FIG. 19C, and corresponds to the state illustrated in FIG. 20E. At this time, the second guide portions 223 of the revolver 211 are inserted into the second grooves 230, and the first guide portions 222 are retained by the first grooves 229. Thus, the atmosphere communicating hole 4 is maintained in an open state by the pad 8.

Next, the liquid cartridge 200 is detached from the cartridge case 116, and the state transitions from the state illustrated in FIG. 19C to the state illustrated in FIG. 19B. The button 237 is depressed by the abutting face 32 of the cartridge case 116 as illustrated in FIG. 19B, and the button 237 is depressed in the negative direction on the Z axis. At this time, the retention of the first guide portions 222 by the first grooves 229 is released. As a result, the open/closed state of the atmosphere communicating hole 4 by the pad 8 switches from the open state to the closed state.

Upon the second guide portions 223 exiting the second grooves 230, as illustrated in FIG. 21C, the revolver 211 rotates under the biasing force of the spring 9 by a half-pitch of the sawteeth, so that the first sawteeth 226 of the button 237 and the second sawteeth 224 of the revolver 211 mesh. Upon the revolver 211 rotating centered on an axis parallel to the Z axis, the tip ends of the second guide portions 223 abut the first grooves 229, as illustrated in FIG. 21D. At this time, the button 237 is depressed by the abutting face 32 of the cartridge case 116, and the meshed state of the first sawteeth 226 of the button 237 and the second sawteeth 224 of the revolver 211 is maintained. Thus, the closed state in which the atmosphere communicating hole 4 is closed by the pad 8 is maintained.

Next, when the liquid cartridge 200 is further moved in the detaching direction, the action of the abutting face 32 of the cartridge case 116 no longer acts on the button 237, and the state transitions from the state in FIG. 19B to the state in FIG. 19A. At this time, the revolver 211 is pressed by the rod 10 by biasing force from the spring 9 on the rod 10 in the positive direction on the Z axis, as illustrated in FIG. 21E. The second guide portions 223 of the revolver 211 move along the inclined faces of the first grooves 229, and the second guide portions 223 are in a state of being retained by the first grooves 229. As a result, the closed state in which the atmosphere communicating hole 4 is closed by the pad 8 is maintained, in the same way as with the state in FIG. 20A.

As described above, the first sawteeth 226 of the button 237 and the second sawteeth 224 of the revolver 211 can assume a first meshed state of shallow meshing (FIGS. 20A, 20B, 20D, 20E, etc.), and a second meshed state of deep meshing (FIG. 20C, etc.). Upon the button 237 being depressed in a state in which movement of the pad 8 and the rod 10 in the depressing direction is restricted, the state changes from the first meshed state to the second meshed state. Force causing the revolver 211 to rotate about an axis of rotation extending in the depressing direction (Z axis) is then applied to the revolver 211, and the revolver 211 rotates with respect to the first attaching member 212. Also, in a state in which the button 237 is not depressed, upon the revolver 211 rotating about the axis of rotation, the first sawteeth 226 of the button 237 and the second sawteeth 224 of the revolver 211 change from the second meshed state to the first meshed state.

Further, the first guide portions 222 and the second guide portions 223, and the first grooves 229 and the second grooves 230, can assume a state in which the movable range of the revolver 211 is restricted to a first movable range, in accordance with the rotational phase of the revolver 211 with respect to the first attaching member 212. Note that this state corresponds to a third meshed state. Also, the first guide portions 222 and the second guide portions 223, and the first grooves 229 and the second grooves 230, can assume a state in which the movable range is restricted to a second movable range, in accordance with the rotational phase of the revolver 211 with respect to the first attaching member 212. Note that this state corresponds to a fourth meshed state. As one example, the third meshed state is a state in which the second guide portions 223 and the first grooves 229 mesh, as illustrated in FIG. 20A. Also, the first movable range of the revolver 211 is such a range that the revolver 211 is movable between a state in which the second guide portions 223 are retained at the first grooves 229 (FIG. 20A) and a state in which the retention is released (FIG. 20B). As one example, the fourth meshed state is a state in which the first guide portions 222 and the first grooves 229 mesh, as illustrated in FIG. 21A. Also, the second movable range of the revolver 211 is such a range that the revolver 211 is movable between a state in which the first guide portions 222 are retained at the first grooves 229 (FIG. 21A) and a state in which the retention is released (FIG. 21C).

Further, the first guide portions 222 and the second guide portions 223, and the first grooves 229 and the second grooves 230, are in the second meshed state in which the first sawteeth 226 of the button 237 and the second sawteeth 224 of the revolver 211 are meshed, and the button 237 is not depressed. At this time, the first guide portions 222 and the second guide portions 223, and the first grooves 229 and the second grooves 230, mesh so as to impart force to the revolver 211 that causes the revolver 211 to rotate about an axis of rotation. The first guide portions 222 and the second guide portions 223, and the first grooves 229 and the second grooves 230, are configured to switch between the third meshed state and the fourth meshed state.

According to the liquid cartridge 200 having the valve mechanism 207 according to the present embodiment, a user of the liquid cartridge 200 can perform switching of the open/closed states of the atmosphere communicating hole 4 by the work of mounting the liquid cartridge 200 to the recording apparatus 100, without the trouble of manual operation. Also, the open/closed states of the atmosphere communicating hole 4 are switched in accordance with mounting and detaching the liquid cartridge 200 to and from the recording apparatus 100. Accordingly, even in a case of detaching the liquid cartridge 200 mounted to the recording apparatus 100 from the recording apparatus 100, ink is prevented from leaking out from the atmosphere communicating hole 4, since the atmosphere communicating hole 4 is in a closed state.

Although the present embodiment has been described above, the configuration and processing of the above liquid cartridge are not limited to the above embodiments, and various modifications may be made insofar as sameness with the technical spirit of the present invention is not lost.

According to the technology of the present disclosure, a liquid cartridge is provided in which the liquid cartridge can be mounted and detached with repelling force of a degree of an elastic member blocking a communicating hole, without liquid leaking from a liquid container even when the liquid cartridge is detached from an apparatus.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-154580, filed on Sep. 22, 2021, which is hereby incorporated by reference herein in its entirety.

What is claimed is:

1. A liquid cartridge, comprising:

a container including a reservoir in which a liquid used for recording images is reserved, a supply hole for causing the liquid reserved in the reservoir to flow to outside of the reservoir, and a communicating hole for causing inside of the reservoir to communicate with an atmosphere; and a valve mechanism that opens and closes the communicating hole, wherein the liquid cartridge is configured to be capable of supplying the liquid reserved in the reservoir to the outside through the supply hole by the valve mechanism opening the communicating hole and cause the inside of the reservoir to communicate with the atmosphere, the valve mechanism includes a pressed member configured to be movable in a predetermined depressing direction by being pressed, a valve element that is disposed further in the depressing direction than the pressed member, and that is configured to be capable of moving to come into contact with or to be distanced from the communicating hole in accordance with a depressing amount of the pressed member, and open and close the communicating hole, a biasing member that biases the valve element in a direction opposite to the depressing direction, and a switching mechanism that is a restricting portion restricting a movable range of the pressed member in the depressing direction, and also that is capable of switching a range of restricting the movable range, the valve element is configured to change from an open state of opening the communicating hole to a closed state of closing the communicating hole when the depressing amount reaches a first depressing amount, and to maintain the closed state under a second depressing amount that is greater than the first depressing amount, the restricting portion has a first restricting portion that restricts the movable range to a first movable range in which the valve element maintains the closed state regardless of a magnitude of the depressing amount, and a second restricting portion that restricts the movable range to a second movable range in which the valve element can assume either of the open state and the closed state, and when the depressing amount reaches the second depressing amount, the switching mechanism switches restriction of the movable range by the restricting member from one to another of a first restricting state by the first restricting portion and a second restricting state by the second restricting portion, and from the other to the one.

2. The liquid cartridge according to claim 1, wherein the switching mechanism includes a protruding portion that is provided on the pressed member, protruding in a direction orthogonal to the depressing direction, and a guide supporting member that movably supports the pressed member and the valve element along the depressing direction, and that includes a guide hole extending in the depressing direction of insertion of the pressed member and the valve element, and a restricting groove that is annularly provided on an inner circumferential face of the guide hole, to which the protruding portion is fit, the restricting groove has groove lateral surfaces that are opposing in a direction along the depressing direction, the opposing groove lateral surfaces include a first opposing region opposing over a first spacing in the direction along the depressing direction, as the first restricting portion, a second opposing region opposing over a second spacing that is larger than the first spacing in the direction along the depressing direction, as the second restricting portion, and the pressed member rotates about an axis of rotation extending in the depressing direction through the guide hole, with the protruding portion being guided by the restricting groove, and a restriction state of the movable range being changed by a position at which the protruding portion fits to the restricting groove changing in a circumferential direction about the axis of rotation.

3. The liquid cartridge according to claim 2, wherein the opposing groove lateral surfaces are disposed with the first opposing region and the second opposing region being alternately repeated in the circumferential direction about the axis of rotation, and include, between the first opposing region and the second opposing region, an inclined face that is inclined with respect to the circumferential direction, to impart the protruding portion with force to rotate the pressed member in one rotation direction about the axis of rotation.

4. The liquid cartridge according to claim 1, wherein the switching mechanism includes a first concave and convex portion provided on an end portion of the pressed member in the depressing direction, a transmission member that is disposed between the pressed member and the valve element and is provided at an end portion facing the pressed member, and that includes a second concave and convex portion that is engageable with the first concave and convex portion, and a third concave and convex portion that is provided on an outer circumference of the second concave and convex portion, and a guide supporting member that movably supports the pressed member, the transmission member, and the valve element in the depressing direction, and that includes a guide hole extending in the depressing direction of insertion of the pressed member, the transmission member, and the valve element, and a fourth concave and convex portion that is provided on an inner circumferential face of the guide hole and that is engageable with the third concave and convex portion, the first concave and convex portion and the second concave and convex portion are configured to be able to assume a first meshed state of shallow meshing, and a second meshed state of deep meshing, change from the first meshed state to the second meshed state when the pressed member is further depressed in a state in which movement of the valve element in the depressing direction is restricted, impart the transmission member with force to rotate the transmission member about an axis of rotation extending in the depressing direction, and cause the transmission member to rotate with respect to the guide supporting member, and are configured to change from the second meshing state to the first meshing state when the transmission member rotates about the axis of rotation in a state in which the pressed member is not depressed, and the third concave and convex portion and the fourth concave and convex portion are configured to be able to assume a third meshed state in which the movable range is restricted to the first movable range, and a fourth meshed state in which the movable range is restricted to the second movable range, in accordance with a phase of rotation of the transmission member with respect to the guide supporting member, and are configured to mesh to impart the transmission member with force to rotate the transmission member about the axis of rotation when the first concave and convex portion and the second concave and convex portion are in the second meshed state, and the pressed member is in a state of not being depressed, and to switch the state of meshing between the third meshed state and the fourth meshed state.

5. The liquid cartridge according to claim 1, wherein the valve element includes a shaft portion, and a skirt-like elastic sealing member that is provided on an end of a side of the shaft portion that faces the communicating hole, wherein the elastic sealing member comes into close contact with an end face of the container in which the communicating hole opens, surrounding the communicating hole, thereby realizing the closed state in which the communicating hole is closed, and the elastic sealing member spreads wider when the depressing amount increases, thereby maintaining the closed state in the second depressing amount as well.

6. The liquid cartridge according to claim 1, wherein the container further includes an atmospheric chamber of which an inside communicates with the atmosphere, the communicating hole is provided on a partition between the reservoir and the atmospheric chamber, and the valve mechanism is provided in the atmospheric chamber with at least an upstream-side end portion of the pressed member in the depressing direction exposed to the outside of the container as a pressed portion.

7. The liquid cartridge according to claim 1, wherein the liquid cartridge is detachably mountable to a recording apparatus, and the depressing direction intersects a mounting and detaching direction of the liquid cartridge with respect to the recording apparatus.

8. The liquid cartridge according to claim 7, wherein when detached from the recording apparatus, the movable range is restricted to the first movable range, and when mounted to the recording apparatus, the movable range is restricted to the second movable range, and the valve element is maintained in the open state under biasing force of the biasing member.

* * * * *